US007069232B1

(12) United States Patent
Fox et al.

(10) Patent No.: US 7,069,232 B1
(45) Date of Patent: Jun. 27, 2006

(54) SYSTEM, METHOD AND COMPUTER PROGRAM PRODUCT FOR SHORT-RANGE WEATHER ADAPTED, BUSINESS FORECASTING

(75) Inventors: Frederic D. Fox, Berwyn, PA (US); Steven A. Beck, Spring City, PA (US); Mark D. Compher, Downingtown, PA (US); William E. Kirk, Easton, PA (US); James R. VanOstenbridge, Norristown, PA (US); David G. Estornell, Lincoln University, PA (US); Paul E. Walsh, Downingtown, PA (US)

(73) Assignee: Planalytics, Inc., Wayne, PA (US)

( * ) Notice: Subject to any disclaimer, the term of this patent is extended or adjusted under 35 U.S.C. 154(b) by 1146 days.

(21) Appl. No.: 09/656,397

(22) Filed: Sep. 6, 2000

Related U.S. Application Data

(63) Continuation-in-part of application No. 09/097,714, filed on Jun. 16, 1998, which is a continuation of application No. 08/588,248, filed on Jan. 18, 1996, now Pat. No. 5,832,456.

(51) Int. Cl.
*G06F 17/60* (2006.01)
(52) U.S. Cl. .......................... 705/10; 705/36
(58) Field of Classification Search ............... 705/1, 705/26, 14, 10, 36; 707/100
See application file for complete search history.

(56) References Cited

U.S. PATENT DOCUMENTS

| | | | |
|---|---|---|---|
| 3,808,410 A | 4/1974 | Schlesinger | 235/156 |
| 4,015,366 A | 4/1977 | Hall, III | 47/1 R |
| 4,040,629 A | 8/1977 | Kelly | |
| 4,218,755 A | 8/1980 | Root | 364/900 |
| 4,766,539 A | 8/1988 | Fox | 364/401 |
| 4,784,150 A | 11/1988 | Voorhies et al. | 128/664 |
| 5,063,506 A | 11/1991 | Brockwell et al. | 364/402 |
| 5,128,861 A | 7/1992 | Kagami et al. | 364/403 |
| 5,128,862 A | 7/1992 | Mueller | 364/405 |
| 5,130,925 A | 7/1992 | Janes et al. | 364/420 |
| 5,140,523 A | 8/1992 | Frankel et al. | 364/420 |
| 5,168,445 A | 12/1992 | Kawashima et al. | 364/403 |
| 5,189,606 A | 2/1993 | Burns et al. | 364/401 |
| 5,208,665 A | 5/1993 | McCalley et al. | 358/86 |
| 5,237,496 A | 8/1993 | Kagami et al. | 364/401 |
| 5,250,941 A | 10/1993 | McGregor et al. | 340/825.65 |

(Continued)

FOREIGN PATENT DOCUMENTS

FR 2 751 774 * 7/1996

(Continued)

OTHER PUBLICATIONS

Luchetti, A., "Cold Winter On the Way ? Some bet on it", Wall Street Journal, Nov. 6, 1997.*

(Continued)

*Primary Examiner*—Frantzy Poinvil
(74) *Attorney, Agent, or Firm*—Sterne, Kessler, Goldstein & Fox P.L.L.C.

(57) ABSTRACT

A system, method and computer program product for short-term forecasting of future retail performance are described herein. The system includes a Web-based graphical user interface, a weather history database and a weather forecast database. The method and computer program product allow users (e.g., retail managers and the like) to produce maps and related charts, using weather and sales history correlation analyzes, indicating weather favorability for specific retail products in specific geographic areas during specific future (and past) time periods. The weather favorability maps thereby facilitate retail-based advertising, allocation, placement, promotion and staffing decisions.

12 Claims, 29 Drawing Sheets

U.S. PATENT DOCUMENTS

| | | | |
|---|---|---|---|
| 5,253,165 A | 10/1993 | Leiseca et al. | 364/407 |
| 5,253,181 A | 10/1993 | Marui et al. | 364/489 |
| 5,283,865 A | 2/1994 | Johnson | 395/161 |
| 5,295,064 A | 3/1994 | Malec et al. | |
| 5,295,069 A | 3/1994 | Hersey et al. | 364/419.17 |
| 5,309,355 A | 5/1994 | Lockwood | 364/401 |
| 5,377,095 A | 12/1994 | Maeda et al. | |
| 5,491,629 A | 2/1996 | Fox et al. | 364/420 |
| 5,504,675 A * | 4/1996 | Cragun et al. | 705/14 |
| 5,521,813 A | 5/1996 | Fox et al. | 364/401 |
| 5,712,985 A | 1/1998 | Lee et al. | 395/207 |
| 5,796,932 A | 8/1998 | Fox et al. | 395/161 |
| 5,832,456 A | 11/1998 | Fox et al. | |
| 5,855,006 A | 12/1998 | Huemoeller et al. | 705/9 |
| 6,012,834 A * | 1/2000 | Dueck et al. | 700/238 |
| 6,018,640 A | 1/2000 | Blackman et al. | 399/364 |
| 6,021,402 A | 2/2000 | Takriti | |
| 6,067,525 A | 5/2000 | Johnson et al. | 705/10 |
| 6,418,417 B1 | 7/2002 | Corby et al. | |
| 6,584,447 B1 | 6/2003 | Fox et al. | |

FOREIGN PATENT DOCUMENTS

| | | |
|---|---|---|
| JP | 1 236 396 | 9/1989 |
| JP | 1 259 488 | 10/1989 |
| JP | 2 268 396 | 11/1990 |
| JP | 2 299 059 | 12/1990 |
| JP | 4 77896 | 3/1992 |
| JP | 4 135 271 | 5/1992 |
| JP | 4 353 970 | 12/1992 |
| JP | 5 189 406 | 7/1993 |
| JP | 6 76161 | 3/1994 |
| JP | 6 149 833 | 5/1994 |

OTHER PUBLICATIONS

Malliaris, M., "Beating the Best: A Neutral Network Challenges the Black-Scholes Formula", Proceedings of the Conference on Artificial Intelligence for Applications, US, Los Alamitos, IEEE Comp. Soc. Press, 1993, pp. 445-449, XP000379639.*

Schwartz, S., Modeling tools aid in financial risk management, Insurance & Technology, vol. 21, No. 4, pp. 20-21 (Apr. 1996).*

Stix, G., "A Calculus of Risk", Scientific Americal, pp. 92-97 (May 1998).*

Studwell, A., "Weather Derivatives", 11th Conference on Applied Climatology, Jan. 10-15, 1999, pp. 36-40, XP00089822, p. 36, col. 1, line 1-p. 40, col. 1, line 33.*

Turvey, Calum, "Weather Derivatives for Specific Event Risks in Agriculture", Review of Agricultural Economics, American Agricultural Economics Association, vol. 23, No. 2, pp. 333-351 (Spring/Summer 2001).*

Upbin, B., "Beting against God", Forbes, vol. 162, No. 1, p. 108 (1) (Jul. 6, 1998).*

Banham, R., Reinsurers Seek Relief in Computer Predicions:, Aug. 1993, pp. 14-16, 18-19, XP002082269, p. 14, col. 1, line 1, col. 2, line 29.*

Gotschall, Mary G., Bullish on weather, Electric Perspectives, Washington, vol. 23, No. 5, p. 30, Sep./Oct. 1998).*

Hunter, R., "Forecast for Weather Derivatives: Hot Derivatives Strategy", May 1999, pp. 1-6, XP002133864, as printed from http://derivatives.com/magazine/arrive/1998/0598feal.asp> p. 1, line 1-p. 6, line 9.*

Brennan, "Portfolio Managers Weather Global Risk Management Challenge," Wall Street Computer Review, 7(1):20, 1989.

Best et al., "Air Weather Service Model Output Statistics Systems," USAF Air Weather Service, NTIS, AD-A139129, 1983.

Jensen, Cary and Anderson, Loy, Harvard Graphics: The Complete Reference, Osborne McGraw-Hill,pp. 5, 16, 17, 126-129, 737-747, 1990.

Cave, "Weather Service Is a Boon To System Dispatchers," Transmission & Distribution, 43(8):165, 166, 168-169, 1991.

Hurrell, "The Weather Business," Intercity, pp. 29, 31-32, Feb. 1991.

Mitchell et al., "Where No Computer Has Gone Before: Massively Parallel Processing Promises Unparalled Performance," Business Week, pp. 81-84, 88, 1991.

The Met Office, "The Weather Initiative," Berkshire, England.

Engle, R.F., et al., "Model Peak Electricity Demand," Journal of Forecasting, vol. 11, No. 3, pp. 241-251, 1992.

Microsoft Access™ User's Guide, Microsoft Corporation, pp. 22-27, 36-39, 327-335, 370-373, 395-447, 1992.

Microsoft Excel™ User's Guide, Microsoft Corporation, pp. 280-281, 596-600, 706-708, 1992.

"Down to Earth Sales Analysis 3.1," Business Software Database, date of release: 1989, available in DIALOG, File No. 256.

"IMREX Demand Forcasting System," Business Software Database, date of release: 1984, available in DIALOG, File No. 256.

"Demand Modeling & Forecasting System," Business Software Database, date of release: 1984, available in DIALOG, File No. 256.

Ehrenberg, A.S.C. et al., "The After Effects of Price-Related Consumer Promotions," Journal of Advertising Research, vol. 34, No. 4, pp. 11-22, 1994.

Mitchell, R. et al., "Where No Computer Has Gone Before: Massively Parellell Processing Promises Unparalleled Performance," Business Week, McGraw-Hill, pp. 80-84 and 88 (Nov. 25, 1991).

The Weather Initiative, (Brochure), The Met Office, 23 pages (1990).

English-language Abstract of Japanese Patent Publication No. 01-2365396, from http://www1.1pdl.jpo.go.jp, 2 Pages (Sep. 21, 1989 - Date of publication of application).

English-language Abstract of Japanese Patent Publication No. 01-259488, from http://www1.ipdl.jpo.go.jp, 2 Pages (Oct. 17, 1989 - Date of publication of application).

English-language Abstract of Japanese Patent Publication No. 02-268396, from http://www1.ipdl.jpo.go.jp, 2 Pages (Nov. 2, 1990 - Date of publication of application).

English-language Abstract of Japanese Patent Publication No. 03-299059, from http://www1.ipdl.jpo.go.jp, 2 Pages (Dec. 11, 1990 - Date of publication of Application).

English-language Abstract of Japanese Patent Publication No. 04-077896, from http://www1.ipdl.jpo.go.jp, 2 Pages (Mar. 11, 1992 - Date of publication of application).

English-language Abstract of Japanese Patent Publication No. 04-135271, from http://www1.ipdl.jpo.go.jp, 2 Pages (May 8, 1992 - Date of publication of application).

Enblish-language Abstract of Japanese Patent Publication No., 04-353970, from http://www1.ipdl.jpo.go.jp, 2 Pages (Dec. 8, 1992 - Date of publication of application).

English-language Abstract of Japanese Patent Pulbication No. 05-189406, from http://www1.ipdl.jpo.go.jp, 2 Pages (Jul. 30, 1993 - Date of publication of application).

English-language Abstract of Japanese Patent Publication No. 06-076161, from http://www1.ipdl.jpo.go.jo, 2 Pages (Mar. 18,1994 - Date of publication of application).

English-language Abstract of Japanese Patent Publication No. 06-149833, from http://www1.ipdl.jpo.go.jp, 2 Pages (May 31, 1994 - Date of publication of application).

* cited by examiner

HEATERS / FILTERS

| B | DRY | SHOWERS | RAIN | SNOW |
|---|-----|---------|------|------|
| V. WARM | -2 | -2 | -1 | 0 |
| WARM | -1 | -1 | -1 | 0 |
| SEASONAL | 0 | 0 | -1 | -1 |
| COLD | 1 | 2 | 2 | 2 |
| V. COLD | 2 | 2 | 2 | 2 |

HUMIDIFIERS

| C | DRY | SHOWERS | RAIN | SNOW |
|---|-----|---------|------|------|
| V. WARM | -2 | -2 | -2 | 0 |
| WARM | -1 | -1 | -1 | 0 |
| SEASONAL | 0 | 0 | 0 | 0 |
| COLD | 2 | 2 | 1 | -1 |
| V. COLD | 2 | 2 | 1 | -1 |

FIG.6B

| D | DRY | SHOWERS | RAIN | SNOW |
|---|---|---|---|---|
| V. WARM | 2 | 1 | -1 | -2 |
| WARM | 2 | 1 | -1 | -2 |
| SEASONAL | 1 | 0 | -1 | -2 |
| COLD | -1 | -1 | -2 | -2 |
| V. COLD | -1 | -1 | -2 | -2 |

5 BEDDING PLANTS
6 TREES & SHRUBS
WARM IS GOOD

| E | DRY | SHOWERS | RAIN | SNOW |
|---|---|---|---|---|
| V. WARM | -1 | -1 | -2 | -2 |
| WARM | 0 | 0 | -2 | -2 |
| SEASONAL | 2 | 2 | -1 | -2 |
| COLD | 1 | 1 | -1 | -2 |
| V. COLD | -1 | -1 | -2 | -2 |

5 BEDDING PLANTS
6 TREES & SHRUBS
SEASONAL IS GOOD

FIG.6C

|   |   | DRY | SHOWERS | RAIN | SNOW |
|---|---|---|---|---|---|
| F | V. WARM | -2 | -2 | -2 | -2 |
|   | WARM | -1 | -1 | -2 | -2 |
|   | SEASONAL | 1 | 1 | -1 | -2 |
|   | COLD | 2 | 2 | -1 | -2 |
|   | V. COLD | 1 | 1 | -1 | -2 |

| | | DRY | SHOWERS | RAIN | SNOW |
|---|---|---|---|---|---|
| G | V. WARM | 2 | 1 | -1 | -2 |
|   | WARM | 2 | 1 | -1 | -2 |
|   | SEASONAL | 1 | 0 | -1 | -2 |
|   | COLD | -1 | -1 | -2 | -2 |
|   | V. COLD | -1 | -1 | -2 | -2 |

FIG.6D

5 BEDDING PLANTS
6 TREES & SHRUBS
COLD IS GOOD

7 GED SOIL/PEAT/MULCH
WARM/DRY GOOD

7 GED SOIL/PEAT/MULCH SEASONAL/DRY GOOD

| H | DRY | SHOWERS | RAIN | SNOW |
|---|-----|---------|------|------|
| V. WARM | −1 | −1 | −2 | −2 |
| WARM | 0 | 0 | −2 | −2 |
| SEASONAL | 2 | 1 | −1 | −2 |
| COLD | 1 | 1 | −1 | −2 |
| V. COLD | −1 | −1 | −2 | −2 |

7 GED SOIL/PEAT/MULCH COLD/DRY GOOD

| I | DRY | SHOWERS | RAIN | SNOW |
|---|-----|---------|------|------|
| V. WARM | −2 | −2 | −2 | −2 |
| WARM | 0 | −1 | −2 | −2 |
| SEASONAL | 1 | 1 | −1 | −2 |
| COLD | 2 | 2 | −1 | −2 |
| V. COLD | 1 | 1 | −1 | −2 |

FIG.6E

| FERTILIZER WARM/DRY GOOD | DRY | SHOWERS | RAIN | SNOW |
|---|---|---|---|---|
| V. WARM | 2 | 1 | -1 | -2 |
| WARM | 2 | 1 | -1 | -2 |
| SEASONAL | 1 | 0 | -1 | -2 |
| COLD | 0 | -1 | -2 | -2 |
| V. COLD | -1 | -1 | -2 | -2 |

| FERTILIZERS SEAS.T/SEAS.P GOOD | DRY | SHOWERS | RAIN | SNOW |
|---|---|---|---|---|
| V. WARM | -1 | -1 | -1 | -2 |
| WARM | 0 | 1 | -1 | -2 |
| SEASONAL | 2 | 2 | -1 | -2 |
| COLD | 1 | 1 | -1 | -2 |
| V. COLD | -1 | 0 | -1 | -2 |

FIG.6F

| 8 | FERTILIZERS COLD/SEAS.P GOOD | DRY | SHOWERS | RAIN | SNOW |
|---|---|---|---|---|---|
| L | V. WARM | -2 | -1 | -1 | -2 |
|   | WARM | -1 | 0 | -1 | -2 |
|   | SEASONAL | 0 | 1 | -1 | -2 |
|   | COLD | 1 | 2 | -1 | -2 |
|   | V. COLD | 1 | 1 | -1 | -2 |

| 9 10 | WEED KILLER INSECTICIDES WARM GOOD | DRY | SHOWERS | RAIN | SNOW |
|---|---|---|---|---|---|
| M | V. WARM | 2 | -1 | -1 | -2 |
|   | WARM | 2 | -1 | -1 | -2 |
|   | SEASONAL | 0 | 0 | -1 | -2 |
|   | COLD | 0 | -1 | -2 | -2 |
|   | V. COLD | -1 | -2 | -2 | -2 |

FIG.6G

| WEED KILLER | DRY | SHOWERS | RAIN | SNOW |
|---|---|---|---|---|
| V. WARM | 0 | 0 | −2 | −2 |
| WARM | 0 | 1 | −2 | −2 |
| SEASONAL | 2 | 2 | −1 | −2 |
| COLD | 1 | 1 | −2 | −2 |
| V. COLD | −1 | −1 | −2 | −2 |

9
10 INSECTICIDES
SEASONAL GOOD

| SPRINKLERS/HOSES | DRY | SHOWERS | RAIN | SNOW |
|---|---|---|---|---|
| V. WARM | 2 | 1 | −1 | −2 |
| WARM | 2 | 1 | −1 | −2 |
| SEASONAL | 1 | 0 | −1 | −2 |
| COLD | 1 | −1 | −2 | −2 |
| V. COLD | 0 | −1 | −2 | −2 |

11
WARM/DRY GOOD

FIG.6H

| 12 | MOWERS/TRIMMERS WARM/SEAS P. GOOD | | | | |
|---|---|---|---|---|---|
| P | | DRY | SHOWERS | RAIN | SNOW |
| V. WARM | | 1 | 2 | -1 | -2 |
| WARM | | 1 | 2 | -1 | -2 |
| SEASONAL | | 1 | 1 | -1 | -2 |
| COLD | | 0 | -1 | -2 | -2 |
| V. COLD | | -1 | -1 | -2 | -2 |

| 12 | MOWERS/TRIMMERS SEAS T./SEAS P. GOOD | | | | |
|---|---|---|---|---|---|
| Q | | DRY | SHOWERS | RAIN | SNOW |
| V. WARM | | -2 | 0 | -1 | -2 |
| WARM | | -1 | 1 | -1 | -2 |
| SEASONAL | | 0 | 2 | -1 | -2 |
| COLD | | 1 | 1 | -1 | -2 |
| V. COLD | | -1 | 0 | -1 | -2 |

FIG. 61

| 12 | MOWERS/TRIMMERS COLD T/SEAS P GOOD | R | DRY | SHOWERS | RAIN | SNOW |
|---|---|---|---|---|---|---|
| | | V. WARM | -2 | -1 | -1 | -2 |
| | | WARM | -1 | 0 | -1 | -2 |
| | | SEASONAL | 0 | 1 | -1 | -2 |
| | | COLD | 1 | 2 | -1 | -2 |
| | | V. COLD | 1 | 2 | -1 | -2 |

| | | S | DRY | SHOWERS | RAIN | SNOW |
|---|---|---|---|---|---|---|
| 13 | GARDEN TOOLS | V. WARM | 2 | -1 | -1 | -2 |
| 15 | GRILLS/CHARCOAL | WARM | 2 | -1 | -1 | -2 |
| 16 | O/FURN. LAWN CHAIRS | SEASONAL | 1 | 0 | -1 | -2 |
| 20 | WAX/WASH CHEMICALS | COLD | -1 | -1 | -2 | -2 |
| 31 | HOUSE/DECK PAINT WARM GOOD | V. COLD | -1 | -1 | -2 | -2 |

FIG.6J

|    | T        | DRY | SHOWERS | RAIN | SNOW |
|----|----------|-----|---------|------|------|
| 13 | GARDEN TOOLS | | | -2 | -2 |
| 15 | GRILLS/CHARCOAL | -1 | -1 | -2 | -2 |
| 16 | O/FURN. LAWN CHAIRS | 0 | 0 | | -2 |
| 20 | WAX/WASH CHEMICALS | 2 | 2 | -1 | -2 |
| 31 | HOUSE/DECK PAINT | 1 | 1 | -1 | -2 |
|    | SEASONAL IS GOOD | -1 | -1 | -2 | -2 |

|    | U        | DRY | SHOWERS | RAIN | SNOW |
|----|----------|-----|---------|------|------|
| 13 | GARDEN TOOLS | -2 | -2 | -2 | -2 |
| 15 | GRILLS/CHARCOAL | -1 | -1 | -2 | -2 |
| 16 | O/FURN. LAWN CHAIRS | 1 | 1 | -1 | -2 |
| 20 | WAX/WASH CHEMICALS | 2 | 2 | -1 | -2 |
| 31 | HOUSE/DECK PAINT | 1 | 1 | -1 | -2 |
|    | COLD IS GOOD | | | | |

FIG.6K

| V | DRY | SHOWERS | RAIN | SNOW |
|---|---|---|---|---|
| V. WARM | 2 | | | |
| WARM | 2 | -1 | 0 | -2 |
| SEASONAL | 0 | 0 | -1 | -2 |
| COLD | -1 | -1 | -1 | -2 |
| V. COLD | -1 | -1 | -2 | -2 |

| | |
|---|---|
| 14 | POOL SUPPLIES |
| 24 | WATER TOYS |
| 25 | KID POOLS/POOL TOYS |
| 28 | SUNTAN LOTION |
| 29 | BEACH SUPPLIES |

| W | DRY | SNOW SHWR. | ICE | SNOW |
|---|---|---|---|---|
| V. WARM | -2 | -2 | 0 | 1 |
| WARM | -2 | -1 | 1 | 1 |
| SEASONAL | -1 | 1 | 1 | 2 |
| COLD | 0 | 2 | 2 | 2 |
| V. COLD | 1 | 2 | 2 | 2 |

NOTE: WINTER PRECIP LEGEND

| | |
|---|---|
| 17 | NOW TOOLS/BLOWERS SNOW/ICE/FROST GOOD |

FIRELOGS
COLD/WET GOOD

| X | DRY | R/S SHWRS. | RAIN/ICE | SNOW |
|---|---|---|---|---|
| V. WARM | -2 | -2 | -1 | 0 |
| WARM | -1 | -1 | 0 | 1 |
| SEASONAL | 0 | 0 | 1 | 1 |
| COLD | 1 | 1 | 2 | 2 |
| V. COLD | 2 | 2 | 2 | 2 |

18

BATTERIES
ANTIFREEZE
COLD IS GOOD

| Y | DRY | SHOWERS | RAIN | SNOW |
|---|---|---|---|---|
| V. WARM | -2 | -2 | -2 | 0 |
| WARM | -1 | -1 | -1 | 0 |
| SEASONAL | 0 | 0 | 0 | 1 |
| COLD | 1 | 2 | 2 | 2 |
| V. COLD | 2 | 2 | 2 | 2 |

19
21

NOTE: WINTER PRECIP LEGEND

| 19 | BATTERIES | Z | DRY | SHOWERS | RAIN | SNOW |
|---|---|---|---|---|---|---|
| 21 | ANTIFREEZE | V. WARM | 1 | 2 | 2 | NA |
| | | WARM | 1 | 1 | 1 | NA |
| | | SEASONAL | 0 | 0 | 0 | NA |
| | | COLD | -1 | -1 | -1 | NA |
| | WARM IS GOOD | V. COLD | -2 | -2 | -2 | NA |

| 23 | WIPERS/WASHER FLUID | AA | DRY | SHOWERS | RAIN | SNOW |
|---|---|---|---|---|---|---|
| 30 | UMBRELLAS | V. WARM | -2 | 1 | 2 | 2 |
| | | WARM | -2 | 1 | 2 | 2 |
| | | SEASONAL | -2 | 1 | 2 | 2 |
| | | COLD | -2 | 1 | 2 | 2 |
| | | V. COLD | -2 | 1 | 2 | 2 |

FIG.6N

HAND LOTION

| 27 | BB | DRY | SHOWERS | RAIN | SNOW |
|---|---|---|---|---|---|
| | V. WARM | 0 | -2 | -2 | 0 |
| | WARM | 0 | -1 | -1 | 0 |
| | SEASONAL | 1 | 0 | 0 | 1 |
| | COLD | 2 | 2 | 0 | 1 |
| COLD/DRY GOOD | V. COLD | 2 | 2 | 2 | 2 |

HAND LOTION

| 27 | CC | DRY | SHOWERS | RAIN | SNOW |
|---|---|---|---|---|---|
| | V. WARM | 2 | 1 | 0 | NA |
| | WARM | 1 | 0 | -1 | NA |
| | SEASONAL | 1 | -1 | -1 | NA |
| | COLD | 1 | 0 | -1 | NA |
| WARM/DRY GOOD | V. COLD | 2 | 1 | 0 | NA |

FIG. 60

WEATHER HISTORY 126

| YEAR | MA | DATA TYPE | P1 | P2 | P3 | P4 | P5 | P6 |
|------|------|-----------|------|------|------|------|------|------|
| 1994 | MSA 100 | TEMP.SEA | 46 | 47 | 50 | 51 | 54 | 55 |
| 1995 | MSA 100 | TEMP.SEA | 46 | 47 | 49 | 51 | 53 | 55 |
| 1994 | MSA 100 | SNOW.SEA | 0.7 | 0.2 | 0.2 | 0.1 | 0 | 0.1 |
| 1995 | MSA 100 | SNOW.SEA | 0.8 | 0.2 | 0.2 | 0.1 | 0 | 0 |
| 1994 | MSA 100 | PREC.SEA | 1.01 | 1.03 | 1.08 | 1.1 | 1.12 | 1.1 |
| 1995 | MSA 100 | PREC.SEA | 1.01 | 1.03 | 1.07 | 1.1 | 1.12 | 1.1 |
| 1994 | MSA 100 | SNOW | 0 | 0 | 0 | 0 | 1.2 | 0 |
| 1995 | MSA 100 | SNOW | 0 | 0 | 0 | 0 | 0 | 0 |
| 1994 | MSA 100 | PREC | 1.5 | 0.4 | 0.9 | 1.3 | 1.7 | 0.3 |
| 1995 | MSA 100 | PREC | 1.1 | 0.01 | 2.68 | 1.78 | 0.48 | 0.01 |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP.CAT | -1 | -1 | -1 | -1 | -1 | -1 |
| 1995 | MSA 100 | TEMP.CAT | -1 | -1 | -1 | 0 | -1 | -1 |
| 1994 | MSA 100 | PREC.CAT | -1 | -1 | -1 | -1 | -1 | -1 |
| 1995 | MSA 100 | PREC.CAT | -1 | -1 | -1 | -1 | -1 | -1 |

| YEAR | MA | DATA TYPE | P1 | P2 | P3 | P4 | P5 | P6 |
|---|---|---|---|---|---|---|---|---|
| N+1 | MSA 100 | SNOW | 0.9 | 0.4 | 0.3 | 0.2 | 0 | 0 |
| N+1 | MSA 100 | PREC | 1.1 | 1.05 | 1.05 | 1.00 | 1.15 | 1.2 |
| N+1 | MSA 100 | TEMP | 48 | 49 | 50 | 53 | 55 | 57 |
| N+1 | MSA 100 | TEMP.CAT | 1 | 1 | 1 | 1 | 1 | -1 |
| N+1 | MSA 100 | PREC.CAT | 1 | 0 | -1 | -1 | -1 | -1 |
| N+1 | MSA 100 | SNOW.SEA | 1 | 0.4 | 0.3 | 0.1 | 0 | 0 |
| N+1 | MSA 100 | PREC.SEA | 1.00 | 1.03 | 1.06 | 1.05 | 1.10 | 1.1 |
| N+1 | MSA 100 | TEMP.SEA | 47 | 47 | 49 | 52 | 54 | 55 |

WEATHER FORECAST DATA 900

CALENDAR TABLE 702

| NAME | NULL? | TYPE |
|---|---|---|
| DATE_ID | NOT NULL | DATE |
| YEAR_ID | | NUMBER (38) |
| QUARTER | | NUMBER (38) |
| MONTHNUM | | NUMBER (38) |
| MONTHNAME | | VARCHAR2 (9) |
| WEEKNUM | | NUMBER (38) |
| WEEKDAYNUM | | NUMBER (38) |
| DAYNAME | | VARCHAR2 (9) |
| WEEKEND | | VARCHAR2 (3) |
| HOLIDAYDESC | | VARCHAR2 (16) |
| HOLIDAYFLAG | | VARCHAR2 (3) |

| DATE_ID | YEAR_ID | QUARTER | MONTHNUM | MONTHNAME | WEEKNUM | WEEKDAYNUM | DAYNAME | WEEKEND | HOLIDAYDESC | HOLIDAYFLAG |
|---|---|---|---|---|---|---|---|---|---|---|
| 3-FEB-97 | 1997 | 1 | 1 | FEBRUARY | 1 | 1 | MONDAY | NO | | NO |
| 4-FEB-97 | 1997 | 1 | 1 | FEBRUARY | 1 | 2 | TUESDAY | NO | | NO |
| 5-FEB-97 | 1997 | 1 | 1 | FEBRUARY | 1 | 3 | WEDNESDAY | NO | | NO |
| 6-FEB-97 | 1997 | 1 | 1 | FEBRUARY | 1 | 4 | THURSDAY | NO | | NO |
| 7-FEB-97 | 1997 | 1 | 1 | FEBRUARY | 1 | 5 | FRIDAY | NO | | NO |
| 8-FEB-97 | 1997 | 1 | 1 | FEBRUARY | 1 | 6 | SATURDAY | YES | | NO |
| 9-FEB-97 | 1997 | 1 | 1 | FEBRUARY | 1 | 7 | SUNDAY | YES | | NO |
| 10-FEB-97 | 1997 | 1 | 1 | FEBRUARY | 2 | 1 | MONDAY | NO | | NO |
| 11-FEB-97 | 1997 | 1 | 1 | FEBRUARY | 2 | 2 | TUESDAY | NO | | NO |
| 12-FEB-97 | 1997 | 1 | 1 | FEBRUARY | 2 | 3 | WEDNESDAY | NO | | NO |
| 13-FEB-97 | 1997 | 1 | 1 | FEBRUARY | 2 | 4 | THURSDAY | NO | | NO |
| 14-FEB-97 | 1997 | 1 | 1 | FEBRUARY | 2 | 5 | FRIDAY | NO | VALENTINE'S DAY | YES |
| 15-FEB-97 | 1997 | 1 | 1 | FEBRUARY | 2 | 6 | SATURDAY | YES | | NO |
| 16-FEB-97 | 1997 | 1 | 1 | FEBRUARY | 2 | 7 | SUNDAY | YES | | NO |
| 17-FEB-97 | 1997 | 1 | 1 | FEBRUARY | 3 | 1 | MONDAY | NO | PRESIDENTS DAY | YES |
| 18-FEB-97 | 1997 | 1 | 1 | FEBRUARY | 3 | 2 | TUESDAY | NO | | NO |
| 19-FEB-97 | 1997 | 1 | 1 | FEBRUARY | 3 | 3 | WEDNESDAY | NO | | NO |
| 20-FEB-97 | 1997 | 1 | 1 | FEBRUARY | 3 | 4 | THURSDAY | NO | | NO |
| 21-FEB-97 | 1997 | 1 | 1 | FEBRUARY | 3 | 5 | FRIDAY | NO | | NO |
| 22-FEB-97 | 1997 | 1 | 1 | FEBRUARY | 3 | 6 | SATURDAY | YES | | NO |
| 23-FEB-97 | 1997 | 1 | 1 | FEBRUARY | 3 | 7 | SUNDAY | YES | | NO |

PRECIPITATION LOOKUP TABLE 704

PRECIP_TYPE

| PRECIP_CODE | PRECEDENCE | PRECIP_DEFINITION |
|---|---|---|
| SN | 6 | SNOW |
| ICE | 5 | ICE |
| SNSH | 4 | SNOW SHOWERS |
| RA | 3 | RAIN |
| RASH | 2 | SHOWERS |
| DRY | 1 | DRY |

EVENT_PRECIP_CODE

| EVENT_CODE | EVENT_DEFINITION | PRECIP_CODE |
|---|---|---|
| MISS | MISSING EVENT STRING | DRY |
| UP | UNKNOWN PRECIPITATION | DRY |
| UNINT | UNINTERPRETABLE CODE | DRY |
| TS | THUNDERSTORM | DRY |
| RW | RAINSHOWERS (OBSOLETE CODE) | RASH |
| RN | RAIN (OBSOLETE CODE) | RA |
| IP | ICE PELLETS (OBSOLETE CODE) | ICE |
| PE | ICE PELLETS | ICE |
| DZ | DRIZZLE | RA |
| RA | RAIN | RA |
| SH | SHOWERS | RASH |
| SN | SNOW | SN |
| SG | SNOW GRAINS (SMALL GRANULAR SNOW) | SN |
| IC | ICE CRYSTALS | DRY |
| PL | ICE PELLETS | ICE |
| GR | HAIL | RASH |
| GS | SMALL HAIL OR SNOW PELLETS | RASH |
| BR | MIST (LIGHT FOG) | RASH |
| FG | FOG | DRY |

FIG. 11B

HISTORICAL VALUE TABLE 706 AND FORECAST VALUE TABLE 708

| NAME | NULL? | TYPE |
|---|---|---|
| STATION | NOT NULL | CHAR (4) |
| DAY | NOT NULL | DATE |
| MAX_TEMP | | NUMBER (3) |
| MIN_TEMP | | NUMBER (3) |
| MEAN_TEMP | | NUMBER (3) |
| PRECIP | | NUMBER (6,2) |
| PRECIP_CAT | | VARCHAR2 (9) |
| TYPE | | VARCHAR2 (4) |

FIG. 11C

HISTORICAL CATEGORY TABLE AND FORECAST CATEGORY TABLE 714

| NAME | NULL? | TYPE |
|---|---|---|
| STATION | NOT NULL | CHAR (4) |
| DAY | NOT NULL | DATE |
| MAX_TEMP | | NUMBER (3) |
| MIN_TEMP | | NUMBER (3) |
| MEAN_TEMP | | NUMBER (3) |
| TEMP_CAT | | NUMBER (3) |
| PRECIP | | NUMBER (6,2) |
| PRECIP_CAT | | VARCHAR2 (9) |
| TYPE | | VARCHAR2 (4) |

FIG. 11D

PRODUCT FAVORABILITY TABLE 722

| NAME | NULL? | TYPE |
|---|---|---|
| STATION | NOT NULL | CHAR (4) |
| DAY | NOT NULL | DATE |
| PRODUCT_ID | NOT NULL | NUMBER (10) |
| WX_FAV | | NUMBER (1,2) |

FIG. 11E

GIS TRANSFORM 725 AND GIS COMPARISON TABLE 727

| NAME | NULL? | TYPE |
|---|---|---|
| STATION | | |
| D1 | | NUMBER (1,2) |
| D2 | | NUMBER (1,2) |
| D3 | | NUMBER (1,2) |
| D4 | | NUMBER (1,2) |
| D5 | | NUMBER (1,2) |
| D6 | | NUMBER (1,2) |
| D7 | | NUMBER (1,2) |

FIG. 11F

PRE-GIS TRANSFORMATION

| STATION | DAY | PRODUCT_ID | WX_FAV |
|---------|--------|------------|--------|
| KPHL | 9/4/00 | 1 | 1 |
| KPHL | 9/5/00 | 1 | 2 |
| KPHL | 9/6/00 | 1 | -1 |
| KBWI | 9/4/00 | 1 | 2 |
| KBWI | 9/5/00 | 1 | 0 |
| KBWI | 9/6/00 | 1 | 0 |
| KBOS | 9/4/00 | 1 | 1 |
| KBOS | 9/5/00 | 1 | 2 |
| KBOS | 9/6/00 | 1 | -2 |

FIG. 11G

POST-GIS TRANSFORMATION

| STATION | D1 | D2 | D3 |
|---------|----|----|----|
| KPHL | 1 | 2 | -1 |
| KBWI | 2 | 0 | 0 |
| KBOS | 1 | 2 | -2 |

FIG. 11H

SYSTEM, METHOD AND COMPUTER PROGRAM PRODUCT FOR SHORT-RANGE WEATHER ADAPTED, BUSINESS FORECASTING

CROSS-REFERENCE TO OTHER APPLICATIONS

This application is a continuation-in-part application of and claims priority to Ser. No. 09/097,714, filed Jun. 16, 1998, which is a continuation of Ser. No. 08/588,248, filed Jan. 18, 1996, now U.S. Pat. No. 5,832,456, both of which are incorporated herein by reference in their entirety.

The following applications of common assignee are related to the present application and each are incorporated herein by reference in their entirety:

"System and Method for the Advanced Prediction of Weather Impact on Managerial Planning Applications," Ser. No. 08/002,847, filed Jan. 15, 1993, now U.S. Pat. No. 5,521,813;

"A User Interface For Graphically Displaying the Impact of Weather on Managerial Planning," Ser. No. 08/504,952, filed Jul. 20, 1995, now U.S. Pat. No. 5,796,932; and "System and Method for Determining the Impact of Weather and Other Factors on Managerial Planning Applications," Ser. No. 08/205,494, filed Mar. 4, 1994, now U.S. Pat. No. 5,491,629.

BACKGROUND OF THE INVENTION

1. Field of the Invention

The present invention relates generally to business performance forecasting, and more particularly to weather adapted, business performance forecasting.

2. Related Art

A. Historical Perspective of Retailing

The retail industry has historically been influenced by the shape of the times. For example, the retail industry is impacted by war and peace, lifestyle changes, demographic shifts, attitude progressions, economic expansion and contraction, tax policies, and currency fluctuations.

The period from 1965 to 1975 was marked by growth and segmentation in the retail industry. New types of stores such as department stores, specialty stores, and discount stores appeared, increasing competition in the retail industry. One result of this growth was a decrease in gross margin (sales price−cost of goods sold). Another result was a shifting of supply sources. Originally, merchandise was supplied exclusively by vendors. However, segmentation and growth resulted in specialty chains and discounters manufacturing merchandise in-house (commonly known as vertical integration).

The period from 1975 to 1980 was marked by disillusionment and complexity in the retail industry. Inflation and women entering the work force in significant numbers resulted in a more sophisticated consumer. Many retailers began to rethink the basics of merchandising in terms of merchandise assortments, store presentations, customer service, and store locations. Other less sophisticated retailers continued on an undisciplined and unstructured policy of store growth.

The period from 1980 to 1990 was marked by recovery and opportunity in the retail industry. An economic boom stimulated consumer confidence and demand. This, coupled with the expansion of the previous period, paved the way for the retail industry to overborrow and overbuild. With their increased size, retailers became increasingly unable to manage and analyze the information flowing into their organizations.

B. Retailing Problems and the Evolution of Computing Systems

The problems and opportunities facing the retailer fall into two categories of factors: (1) external factors; and (2) internal (or industry) factors. External factors impacting the retail industry include, for example, adverse or favorable weather, rising labor costs, increasing property costs, increased competition, economics, increasing cost of capital, increasing consumer awareness, increasing distribution costs, changing demographics and zero population growth, decreasing labor pool, and flat to diminishing per capita income.

Internal (or industry) factors affecting the retail industry include, for example, large number of stores (decentralization), homogeneity among retailers, continuous price promotion (equates to decreased gross margin), decreasing customer loyalty, minimal customer service, physical growth limitations, and large quantities of specific retailer store information.

Growth and profitability can only be achieved by maximizing the productivity and profitability of the primary assets of the retail business: merchandise (inventory), people, and retail space. The above external and industry factors have added to a retailer's burdens of maintaining the productivity of these assets.

Of the three primary assets, merchandise productivity is particularly important due to the limiting effect of external and internal factors on people and space productivity (e.g., physical growth limitations and high labor costs). Merchandise productivity can be best achieved by maintaining effective mix of product in a store by product characteristic (merchandise assortments).

To achieve more effective merchandise assortments, a retailer must have a merchandise plan that provides the retailer with the ability to (1) define, source, acquire, and achieve specific target merchandise assortments for each individual store location; (2) achieve an efficient, non-disruptive flow from supply source to store; (3) maintain store assortments which achieve anticipated financial objectives; and (4) communicate effectively across all areas of the business to facilitate coordinated action and reaction.

Such an effective merchandise plan must consider all possible external and industry factors. To obtain this knowledge, a retailer must have responsive and easy access to the data associated with these factors, referred to as external and industry data, respectively. To assimilate and analyze this data, which comes from many sources and in many formats, retailers began utilizing management information systems (MIS). The primary function of the MIS department in the retail industry has been the electronic collection, storage, retrieval, and manipulation of store information. Mainframe-based systems were primarily utilized due to the large amount of store information generated. Store information includes any recordable event, such as purchasing, receiving, allocation, distribution, customer returns, merchandise transfers, merchandise markdowns, promotional markdowns, inventory, store traffic, and labor data. In contrast to the extensive collection and storage of internal data, these systems, did not typically process external data. Rather, this non-industry data was simply gathered and provided to the retailer for personal interpretation.

Since understanding of local and region level dynamics is a requisite for increased retailing productivity, retailers would essentially feed store information at the store level into massive mainframe databases for subsequent analysis to identify basic trends. However, the use of mainframes typically requires the expense of a large MIS department to process data requests. There is also an inherent delay from the time of a data request to the time of the actual execution. This structure prevented MIS systems from becoming cost effective for use by executives in making daily decisions, who are typically not computer specialists and thus rely on data requests to MIS specialists.

In the 1970's and 1980's, retrieval of store information for analysis and subsequent report generation were manually or electronically generated through a custom request to MIS department personnel. More recently, in response to the need for a rapid executive interface to data for managerial plan preparation, a large industry developed in Executive Information Systems (EIS). An EIS system is a computer-based system which typically operates on a personal computer workstation platform and interfaces with the MIS mainframe or mid-range database. EIS systems generally allows information and analysis can be accessed, created, packaged and/or delivered for use on demand by users who are non-technical in background. Also, EIS systems perform specific managerial applications without extensive interaction with the user, which reduces or eliminates the need for computer software training and documentation.

In contrast to store information, external information consists of manual reports covering such topics as economic forecasts, demographic changes, and competitive analysis. In conventional systems, external information is separately made available to the user for consideration in developing managerial plan.

Technical improvements in speed and storage capability of personal computers (PCs) have allowed this trend towards EIS systems to take place, while most firms still maintain a mainframe or minicomputer architecture for basic point of sale (POS) data storage and processing. The advent of powerful mini computers, local area networks (LANs), and PC systems has resulted in many of the traditional mainframe retailing applications migrating to these new platforms.

C. Weather and Planning Activities

Weather anomalies are more of a regional and local event rather than a national phenomenon in countries as geographically large as the United States. This is not to say that very anomalous weather cannot affect an entire country or continent, creating, for example, abnormally hot or cold seasons. However, these events are less frequent than regional or local aberrations. Significant precipitation and temperature deviations from normal events occur continually at time intervals in specific regions and locations throughout the United States.

Because actual daily occurrences fluctuate around the long term "normal" or "average" trend line (in meteorology, normal is typically based on a 30 year average), past historical averages can be a very poor predictor of future weather on a given day and time at any specific location. Implicitly, weather effects are already embedded in an MIS POS database, so the retailer is consciously or unconsciously using some type of historical weather as a factor in any planning approach that uses trendline forecasts based on historical POS data for a given location and time period.

At a national level, weather is only one of several important variables driving consumer demand for a retailer's products. Several other factors are, for example, price, competition, quality, advertising exposure, and the structure of the retailer's operations (number of stores, square footage, locations, etc). Relative to the national and regional implementation of planning, the impact of all of these variables dominates trendline projections.

As suggested above, databases containing POS data track sales trends of specific categories at specific locations which are then aggregated and manipulated into regional and national executive information reports. Since the impact of local weather anomalies can be diluted when aggregated to the national levels (sharp local sales fluctuations due to weather tend to average out when aggregated into national numbers), the impact of weather has not received much scrutiny relative to national planning and forecasting.

The impact of weather on a regional and local level is direct and dramatic. At the store level, weather is often a key driver of sales of specific product categories. Weather also influences store traffic which, in turn, often impacts sales of all goods. Weather can influence the timing and intensity of markdowns, and can create stockout situations which replenishment cycles can not address due to the inherent time lag of many replenishment approaches.

The combination of lost sales due to stockouts and markdowns required to move slow inventory are enormous hidden costs, both in terms of lost income and opportunity costs. Aggregate these costs on a national level, and weather is one of the last major areas of retailing where costs can be carved out (eliminate overstocks) and stores can improve productivity (less markdown allows for more margin within the same square footage).

In short, weather can create windows of opportunity or potential pitfalls that are completely independent events relative to economics, demographics, consumer income, and competitive issues (price, quality). The cash and opportunity costs in the aggregate are enormous.

D. Conventional Approaches Addressing Weather Impact

Though the majority of retailers acknowledge the effects of weather, many do not consider weather as a problem per se, considering it as a completely uncontrollable part of the external environment.

However, the underlying problem is essentially one of prediction of the future (i.e., developing a predictive model). All retailers must forecast (informally or formally) how much inventory to buy and distribute based on expected demand and appropriate inventory buffers. Hence, many conventional predictive modeling processes have been developed, none of which adequately address the impact of weather.

One conventional solution is to purposely not consider the impact of weather on retail sales. In such instances, the retailer will maintain high inventory levels and rapidly replenish the inventory as it is sold. This approach creates large working capital needs to support such a large inventory.

Another conventional solution is for the retailer to qualitatively use weather information to anticipate future demands. This procedure, if used by decision makers, is very subjective and does not evaluate weather in a predictive sense. Nor does it quantify the effect of past and future weather on consumer demands.

Another conventional approach is the utilization of climatology. Climatology is the study of the climates found on the earth. Climatology synthesizes weather elements (temperature, precipitation, wind, etc.) over a long period of time (years), resulting in characteristic weather patterns for a given area for a given time frame (weekly, monthly, seasonally, etc.). This approach does not utilize forecasted weather as a parameter, which can vary considerably from any given time period from year to year for a given area.

Climatology yields only the average weather condition, and is not indicative of the weather for any specific future time frame.

Manufacturers and retailers have been known to rely on broad projections developed by the National Weather Service (the governmental entity in the USA charged with disseminating weather data to the public) and other private forecasting firms. With reference to long range projections, these may be vague, broad, and lack regional or local specificity. It is of limited use since they are issued to cover anticipated weather averaged for 30, 60, or 90 day periods covering large geographic areas. This information cannot be quantified or easily integrated into an MIS-based planning system which is geared toward a daily or weekly time increment for specific location and time.

In summary, the above conventional solutions to weather planning problems in retail all suffer from one or several deficiencies which severely limit their commercial value, by not providing: (1) regional and/or local specificity in measuring past weather impact and projecting future weather impact; (2) the daily, weekly, and monthly increment of planning and forecasting required in the retail industry; (3) ample forecast leadtime required by such planning applications as buying, advertising, promotion, distribution, financial budgeting, labor scheduling, and store traffic analysis; (4) the quantification of weather impact required for precise planning applications such as unit buying and unit distribution, financial budget forecasting, and labor scheduling, (5) reliability beyond a 3 to 5 day leadtime; (6) a predictive weather impact model, which links quantitative weather impact measurement through historical correlation, with quantitative forecasts; (7) the ability to remove historical weather effects from past retail sales for use as a baseline in sales forecasting; (8) an entirely electronic, computerized, EIS implementation for ease of data retrieval/analysis with specific functions that solve specific managerial planning applications; and (9) a graphical user interface representing a predictive model in graphs, formats, and charts immediately useful to the specific managerial applications.

E. Today's Additional Needs

The above-identified nine limitations of conventional solutions to weather planning problems in retail were met be such systems, methods and computer program products disclosed in commonly-assigned U.S. Pat. Nos. 5,491,629; 5,521,813; and 5,796,932; which are incorporated herein by reference in their entirety. However, today's additional needs require improvements where a system, method and computer program product allows a retailer to make tactical and logistical short-term adjustments to their activities. More specifically, the "weekend" days of the week (i.e., Friday, Saturday and Sunday) are the most important days of the week for retailers. It is not uncommon for certain retailers to make an overwhelming majority of their sales during the weekend days. Thus, right before the weekend (e.g., on Wednesday) retailers must often decide which are the best markets to run an advertisement, where to send reserve stock so it has the best chance to sell, where will customers expect to see certain items, and where will store traffic be up or down. In other words, those involved in retail (from marketing to store managers) need a way to obtain a short-range weather-based favorability outlook, by region/market, in order to make informed advertising, allocation, placement, promotion and staffing decisions.

Therefore, what is needed is a system, method and computer program product for short-range weather adapted, business forecasting.

While the above discussion focused on the retail industry (i.e., the impact of weather on the retail industry), the system, method and computer program product for short-range weather adapted, business forecasting should be adaptable to all aspects of human endeavor. This is because the effects of weather are not confined to the retail industry. Accordingly, the discussion above applies equally to many other applications, including but not limited to, retail products and services, manufacturing/production (i.e., construction, utilities, movie production companies, advertising agencies, forestry, mining), transportation, the entertainment industry, the restaurant industry, etc.

SUMMARY OF THE INVENTION

The present invention meets the above-identified needs by providing a system, method and computer program product for short-range weather adapted, business forecasting.

The short-range weather adapted, business forecasting system of the present invention, in an embodiment, includes a historical weather database containing historical weather information for several geographic areas and a future weather database containing weather forecast information for the same geographic areas. The system further includes an application database, connected to the historical weather database and the future weather database, that stores weather favorability matrices for a plurality of retail products. Users access the system via a graphical user interface, connected over a network to the application database, capable of displaying weather favorability maps for any one of the plurality of products for any of the geographic areas, for a given time period.

The system of the present invention also includes an application server, connected to the network, capable of querying the application database and the future weather database in order to generate the weather favorability maps displayed on the graphical user interface. The weather favorability maps produced by the system of the present invention allow the user to make informed retail-based advertising, allocation, placement, promotion and staffing decisions.

The application server is also capable of querying the application database and the historical weather database in order to generate the historical weather favorability maps to be displayed on the graphical user interface. These historical maps allow users to compare the forecasted favorability with historical data.

The method and computer program product of the present invention, in an embodiment, include the steps of providing the user with a selection of product categories and receiving, from the user, a product category input. Next, the user is provided with a selection of specific products within the product category input. The user then enters a specific product selection. The method and computer program product further include receiving specific time period and geographic location inputs from the user.

The method and computer program product then display to the user, via the graphical user interface, a weather favorability map. The map displays the weather favorability for the specific product, within the product category, for the geographic area and for each day within the time period. In an embodiment, the weather favorability map indicates one of the following favorability ratings for each day within the given time period: "more favorable", "favorable", "neutral", "unfavorable", or "less favorable".

One advantage of the present invention is that it allows long-term retail planning to be adjusted using short-range, weather-based favorability outlooks.

Another advantage of the present invention is that it allows retailers to quickly make informed advertising, allocation, placement, promotion and staffing decisions.

Another advantage of the present invention is that it allows retailers to determine sales outlook per product, per geographical region, per time-period.

Yet another advantage of the present invention is that it presents retail users with an outlook of how the upcoming (short-range) weather is expected to affect their sales juxtaposed with historical data.

Further features and advantages of the invention, as well as the structure and operation of various embodiments of the invention, are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 8 depicts, in one embodiment, a weather history database used by the present invention;

FIG. 9 depicts, in one embodiment, a weather forecast database used by the present invention;

FIGS. 11A–H illustrate exemplary data structure designs of the tables used in the weather adapted, retail performance forecasting processing according to one embodiment of the present invention.

DETAILED DESCRIPTION OF THE PREFERRED EMBODIMENTS

TABLE OF CONTENTS

Figure 1:
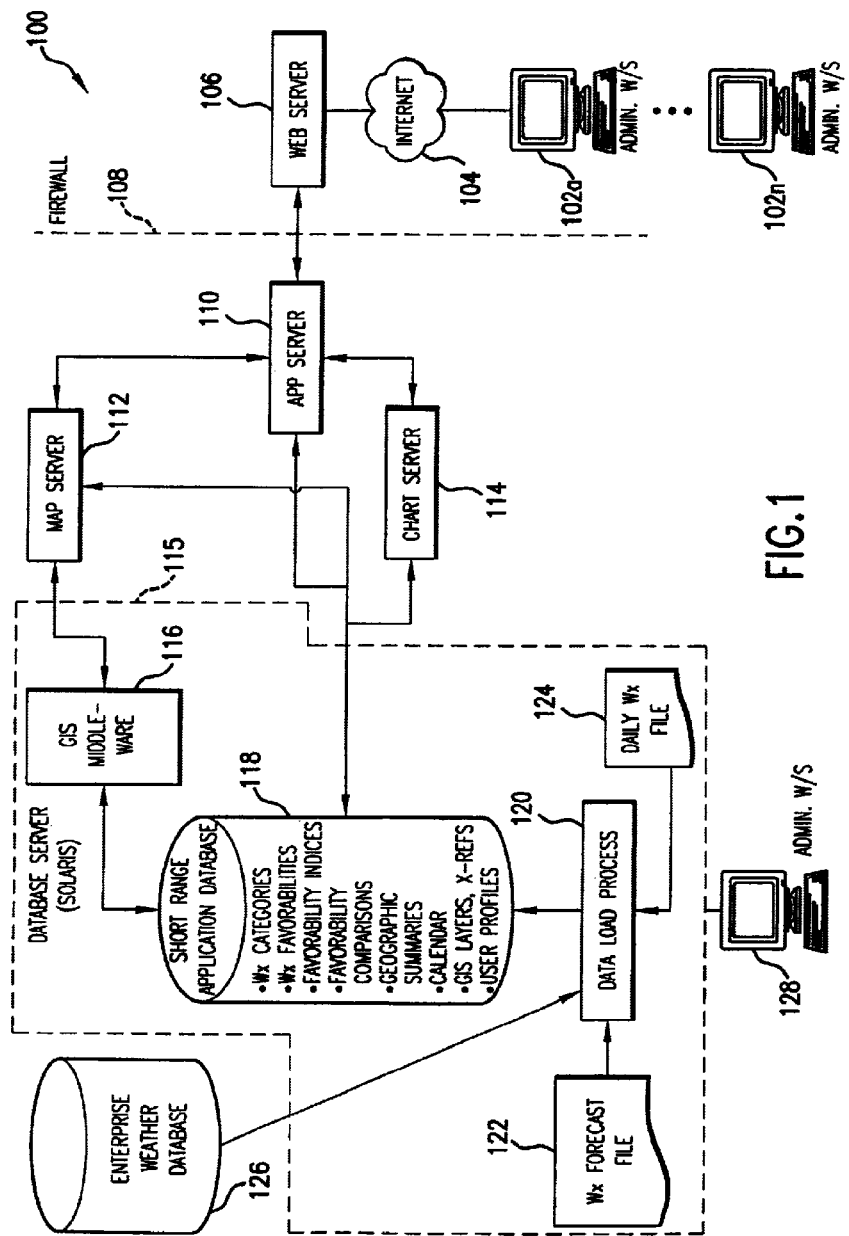
FIG. 1 is a block diagram of a weather adapted, retail performance forecasting system according to an embodiment of the present invention.

I. Overview of the Invention
II. System Architecture
III. Example of System Operation
IV. Weather and Weather Favorability Matrices
V. Functional Description
VI. Weather Databases
   A. Enterprise Weather Database
   B. Weather Forecast Data
   C. Relationship Between Past and Future Weather Data
VII. Example Implementations
VIII. Conclusion

I. Overview of the Invention

The present invention relates to a system, method and computer program product for short-range weather adapted, business forecasting. As used herein, "weather adapted" indicates that the present invention, when forecasting retail performance, takes the affect of weather into consideration. Further, "retail performance" refers to all statistical metrics related to retail sales performance, such as gross revenue, net revenue, unit sales, customer traffic, and the like.

In an embodiment of the present invention, an application service provider supplies and allows access to, on a subscriber basis, a short-range weather adapted, business forecasting tool via the global Internet. That is, the application service provider would provide the hardware (e.g., servers) and software (e.g., database) infrastructure, application software, customer support, and billing mechanism to allow its customers (e.g., retail store managers, marketing, etc.) to determine sales favorability for specific product classes, per region and per time period (i.e., an upcoming weekend). Such customers would include, for example, a national retailer with several stores located across a large geographic area.

More specifically, the application service provider would provide a World Wide Web site where a user using a computer and Web browser software, can plan: advertising (i.e., what are the best markets to run an advertisement); allocation (i.e., where to send reserve stock so it has the best chance to sell); in-store placement and promotions (i.e., where will the customer expect to see certain items); and staffing (where will store traffic be up or down).

In one scenario, a national retailer may decide to run weekend advertising on a regional basis. Unfavorable weather conditions for the products featured in the scheduled advertisements, however, can significantly reduce the return received from the advertising expense (e.g., upcoming cold weather and a plan to promote short pants). Conversely, favorable weather conditions may leave the retailer with a shortage based on increased demand (i.e., upcoming warm weather and a plan to promote sandals). Because weekend advertising can typically be pulled within several days of the weekend, the short-range weather adapted, business forecasting tool of the present invention would allow a retailer to decide—on a region by region basis— whether to run the scheduled advertising or delay until more favorable weather is expected. The short-range weather adapted, business forecasting tool of the present invention provides sales favorability for specific product categories, not just weather information.

In one embodiment, the short-range weather adapted, business forecasting tool of the present invention would be utilized every Monday by a retail user to plan for the upcoming weekend and then used again on Wednesday to receive a final update (i.e., with more accurate weather forecast data).

In an alternate embodiment, the short-range weather adapted, business forecasting tool of the present invention may be run, instead of on the global Internet, locally on proprietary equipment owned by the customers (i.e., retail managers, marketing and the like) as a stand alone software application. In yet another embodiment, users may access the short-range weather adapted, business forecasting tool of the present invention via direct dial-up lines rather than through the global Internet.

The present invention is described in terms of the above examples. This is for convenience only and is not intended to limit the application of the present invention. In fact, after reading the following description, it will be apparent to one skilled in the relevant art(s) how to implement the following invention in alternative embodiments. For example, for illustrative purposes, the present invention has been described above in the context of the retail industry. However, the invention is not limited to this embodiment. The present invention is well suited, adapted, and intended for use with any endeavor, industry and/or market that is potentially or actually impacted by weather. This includes, but is not limited to, retail products and services, manufacturing/production (i.e., construction, utilities, movie production companies, advertising agencies, forestry, mining), transportation, the entertainment industry, the restaurant industry, etc.

The terms "user," "subscriber," "retailer," "entity," "company," and the plural form of these terms are used interchangeably throughout herein to refer to those who would access, use, and thus benefit from the present invention.

II. System Architecture

Referring to FIG. 1, a block diagram illustrating the architecture of a short-range weather adapted, business forecasting tool ("SRWF") system 100, according to an embodiment of the present invention, is shown. FIG. 1 also shows network connectivity among the various components of the SRWF system 100.

The SRWF system 100 includes a plurality of users 102, shown as users 102a–n (e.g., retailer regional managers, store managers, marketing personnel, and the like), who would access system 100 using a personal computer (PC) (e.g., an IBM™ or compatible PC workstation running the Microsoft® Windows 95/98™ or Windows NT™ operating system, Macintosh® computer running the Mac® OS operating system, or the like), or comparable computer or workstation running a commercially available Web browser. In alternative embodiments, users 102 may access SRWF system 100 using any processing device including, but not limited to, a desktop computer, laptop, palmtop, workstation, set-top box, personal data assistant (PDA), and the like.

The users 102 would connect to the parts (i.e., infrastructure) of the SRWF system 100 which are provided by the SRWF application service provider (i.e., elements 106–128 of FIG. 1) via the global Internet 104. The connection to the Internet 104, however, is through a Web server 106 and firewall 108. Thus, the components of the SRWF system 100 are divided into two regions—"inside" and "outside." The components in the "inside" region refer to those components that the SRWF application service provider would have as part of their infrastructure in order to provide the tools and services contemplated by the present invention. As will be apparent to one skilled in the relevant art(s), all of components "inside" of the SRWF system 100 are connected and communicate via a wide or local area network (WAN or LAN) running a secure communications protocol (e.g., secure sockets layer (SSL)).

The Web server 106 is a typical Web server running at a Web site which sends out Web pages in response to Hypertext Transfer Protocol (HTTP) requests from remote browsers (i.e., subscribers 102 of the SRWF application service provider). More specifically, a Web server 106 provides graphical user interface (GUI) "front-end" screens to users 102 of the SRWF system 100 in the form of Web pages. These Web pages, when sent to the subscriber's PC (or the like), would result in GUI screens being displayed. In an embodiment of the present invention, the server 106 would be implemented using a UNIX workstation running either the Solaris™ or Linux® operating systems.

The firewall 108 serves as the connection and separation between the WAN or LAN, which includes the plurality of elements (e.g., elements 110–128) "inside" of the WAN or LAN, and the global Internet 104 "outside" of the WAN or LAN. Generally speaking, a firewall is a dedicated gateway machine (e.g., a SUN Ultra 10) with special security precaution software. It is typically used, for example, to service Internet 104 connections and dial-in lines, and protects the cluster of more loosely administered network elements hidden behind it from external invasion. Firewalls are well known in the relevant art(s) and firewall software is available from many vendors such as Check Point Software Technologies Corporation of Redwood City, Calif.

The SRWF system 100, in an embodiment, also includes four additional servers—an application server 110, a map server 112, a chart server 114, and a database server 115.

The application server 110, connected to the Web server 106, is the "back-bone" (i.e., SRWF processing) of the present invention. The application server 110 facilitates data and commands between the map server 112, chart server 114 and database server 115 on the "back end" and the Web pages on Web server 106 "front end." In an embodiment of the present invention, the application server 110 would be implemented using a UNIX workstation running either the Solaris™ or Linux® operating systems.

The map server 112 is responsible for drawing maps (e.g., regional, national, etc.) in response to user 102 inputs. In an embodiment of the present invention, the map server 112 would be implemented using a UNIX workstation running either the Solaris™ or Linux® operating systems. Further, in an embodiment, map server 112 would run the ArcIMS™ software package available from Environmental Systems Research Institute, Inc. of Redlands, Calif. As will be appreciated by one skilled in the relevant art(s), the ArcIMS™ software package establishes a framework for distributing geographic information system (GIS) capabilities via the Internet 104, and facilitates creation of map services, development of Web pages for communicating with map services, and the administration of map-related Web sites. As will also be appreciated by one skilled in the relevant art(s), the term "GIS" refers to computing systems that capture, store, check, integrate, manipulate, analyze and display data related to positions on the earth's surface.

The chart server 114 is responsible for drawing business chart graphics in response to user 102 inputs. In an embodiment of the present invention, the map server 112 would be implemented using a VA Linux workstation running the Linux® operating system. Further, in an embodiment, chart server 114 would run the KavaChart™ graphics software tool available from Visual Engineering, Inc. of Los Altos, Calif. As will be appreciated by one skilled in the relevant art(s), the KavaChart™ graphics software tool provides a suite of Java components to the application service provider in order to support several types of business and financial charts on their Web site.

The database server 115 includes a GIS middleware component 116, a short-range application database 118, a data load process 120, a weather forecast file 122, and daily weather data files 124. In an embodiment of the present invention, the database server 115 would be implemented using a UNIX workstation running either the Solaris™ or Linux® operating systems.

In an embodiment of the present invention, the application database 118 within the database server 115 is a relational database management system (DBMS) implemented using the Oracle 8i™ RDBMS software package available from the Oracle Corporation of Red Shores, Calif.

The application database 118 is the central store for all information within the SRWF system 100. Connecting the application database 118 and the map server 112 is the GIS middleware component 116. In an embodiment of the present invention, the GIS middleware component 116 is implemented using the ArcSDE™ software package available from Environmental Systems Research Institute, Inc. of Redlands, Calif. As will be appreciated by one skilled in the relevant art(s), the ArcSDE™ software package allows GIS software (i.e., the ArcIMS software executing on the map server 112) to communicate and work directly with spatial data managed in a DBMS (i.e., the application database 118).

The data load process 120 is a module that contains software code logic that is responsible for loading weather ("wx") forecast file 122 and the daily weather data files 124 into the application database 118 within the database server 115. In performing this task, the data load process 120 interprets the format of these two data files.

In an embodiment of the present invention, the weather forecast file 122 is a live data feed of weather forecasts that can be read by the database server 115 during operation of the SRWF system 100. Such weather forecast databases, as described in more detail below, are available from commercial or governmental sources. The data load process 120, however, would need to contain software code logic in order to correctly read and load the various formats of these weather forecast databases (and thus, data file 122).

In an embodiment of the present invention, the daily weather data files 124 would comprise historical weather data commercially available from Agricultural Weather Information Service, Inc. of Auburn, Ala. The use of daily weather data files 124 within SRWF system 100 is explained in greater detail below.

The SRWF system 100 also includes an enterprise weather database 126 that is connected to the database server 115. The enterprise weather database 126 includes the historical weather data needed by the SRWF system 100 as explained in further detail below.

SRWF system 100 also includes an administrative workstation 128. This workstation can be used by personnel of the SRWF application service provider to upload, update, and maintain subscriber information (e.g., logins, passwords, etc.) and related data for each of the users 102 that subscribe to the SRWF system 100. The administrative workstation 134 may also be used to monitor and log statistics related to the application server 118 and the SRWF system 100 in general.

More detailed descriptions of the SRWF system 100 components, as well their functionality, are provided below.

III. Example of System Operation

Figure 2:
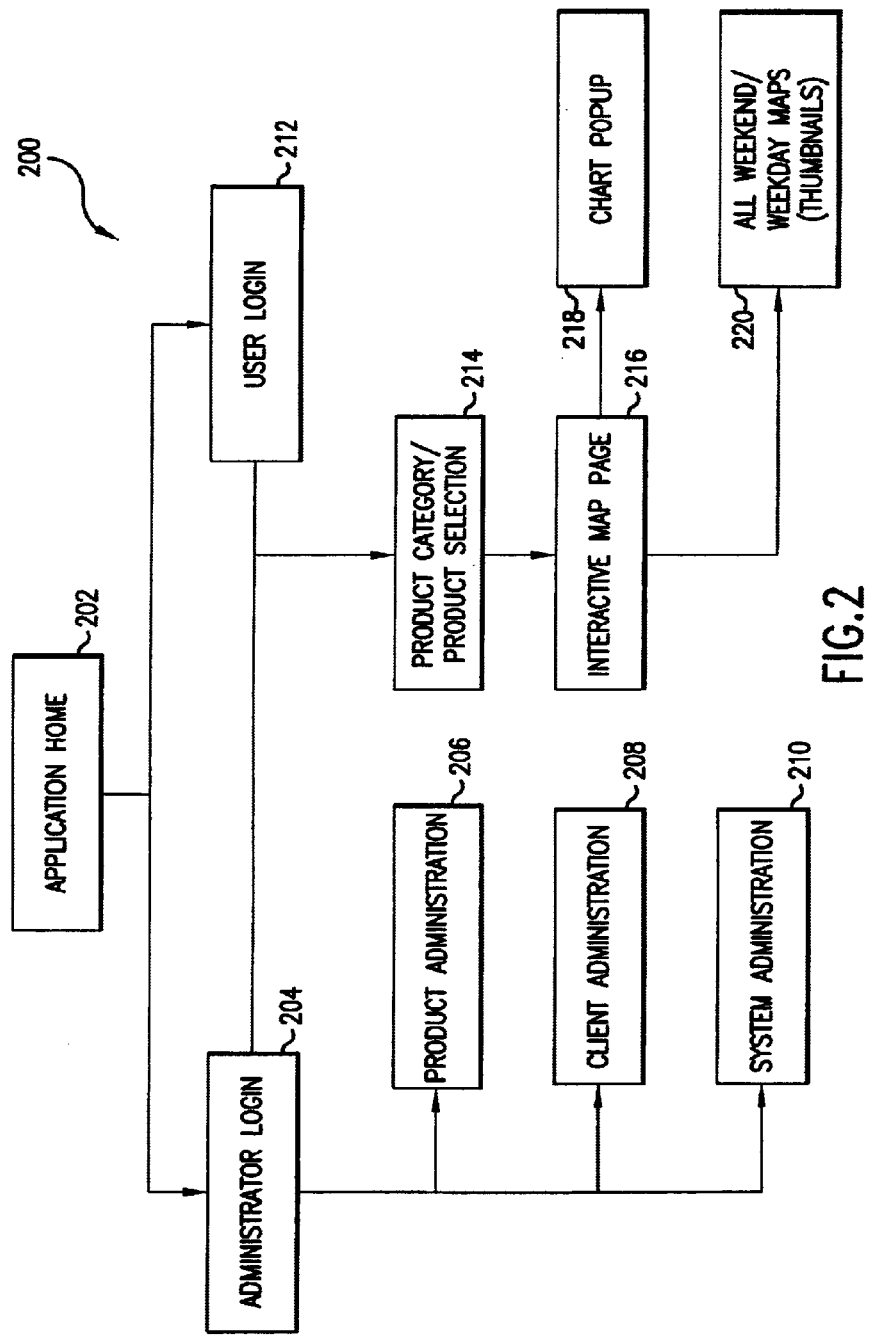
FIG. 2 is a flow diagram illustrating a Web navigation of the weather adapted, retail performance forecasting system, according to an embodiment of the present invention.

Referring to FIG. 2, a flow diagram illustrating a Web navigation 200 of the SRWF system 100, according to an embodiment of the present invention, is shown. That is, Web navigation 200 illustrates how users 102 and personnel of the application service provider would access and use SRWF system 100. It should be understood that the steps of navigation 200 highlight the functionality of the SRWF system 100 and are each associated with one or more individual graphical user interface screens.

Web navigation 200 begins at step 202 where the SRWF application "home" page would be presented to users 102 via their Web browser or to personnel of the service provider via a Web browser executing on the administrative workstation 128. Step 202 represents the point of entry into the SRWF system 100 where, for example, the application service provider would indicate that the SRWF tool of the present invention is available for use on a subscription basis or on a per use basis. The GUI screen(s) associated with step 202 would also present a choice as to subscriber 102 login or administrative login.

Navigation 200 would proceed to step 204 in the case of an administrative login (i.e., personnel of the application service provider attempting to access and use SRWF system 100 using the administrative workstation 128). The GUI screen(s) associated with step 204 would prompt for and validate administrative user logins and passwords, as well as deny access to those who entered incorrect logins and/or passwords.

In the case of a successful administrative user login, the GUI screen(s) associated with step 204 would present a choice as to whether the administrative user would like to perform product administration functions, client administration functions, or system administration functions as represented by steps 206, 208 and 210 of navigation 200, respectively.

In step 206 the administrative user may perform product administration functions. That is, various associated GUI screen(s) would allow the administrative user to create, modify, and/or delete favorability matrices of the present invention as described in more detail below. The administrative user may also create, modify, and/or delete product analysis parameters indicating favorability matrix values for each pertinent time period referenced within the calendar of the SRWF system 100. Further, the product administration functions include capabilities for creating or modifying associations between products and product categories, as well as allow product weather favorability metrics to be associated with multiple products as also explained in greater detail below.

In step 208 the administrative user may perform client administration functions. That is, various associated GUI screen(s) would allow the administrative user to create, modify, and/or delete clients (i.e., subscriber users 102), group profiles, etc.

In step 210 the administrative user may perform system administration functions. That is, various associated GUI screen(s) would allow the administrative user to obtain reports containing operational and performance metrics associated with the databases 115 and 126 and the SRWF system 100 as a whole.

Navigation 200 may also proceed from step 202 to step 212 in the case of a user 102 login (e.g., a subscriber/customer of the application service provider attempting to access and use SRWF system 100 via the World Wide Web). The GUI screen(s) associated with step 212 would prompt for and validate user 102 logins and passwords, as well as deny access to those who entered incorrect logins and/or passwords.

In the case of a successful user 102 login, navigation 200 proceeds to step 214. In step 214, the user 102 is presented with a GUI screen that presents a choice of product categories and specific product selections. That is, the user 102 is presented with categories of products for which they would like to display short-range weather adapted, business forecasting for. These categories would include, for example, "HVAC," "lawn & garden," "automotive," "women's apparel," "toys," etc. and the data to support such selections would reside within application database 118.

Once the user 102 selects a product category, user 102 is presented with a list of specific products that fall into the selected category. For example, if the user 102 selected "HVAC" as the product category, they would be presented with a GUI screen that has, for example, "air conditioning units," "fans," "heaters," "filters," "humidifiers," etc. as the specific product choices. Likewise, if the user 102 selected "automotive" as the product category, they would be presented with a GUI screen that has, for example, "batteries," "air conditioning units," "antifreeze," "wiper/washer fluid," etc. as the specific product choices. As will be apparent to one skilled in the relevant art(s), the application service provider would group products into categories readily ascertainable to those in the retail industry who seek to take advantage of the SRWF system 100.

Figure 3:
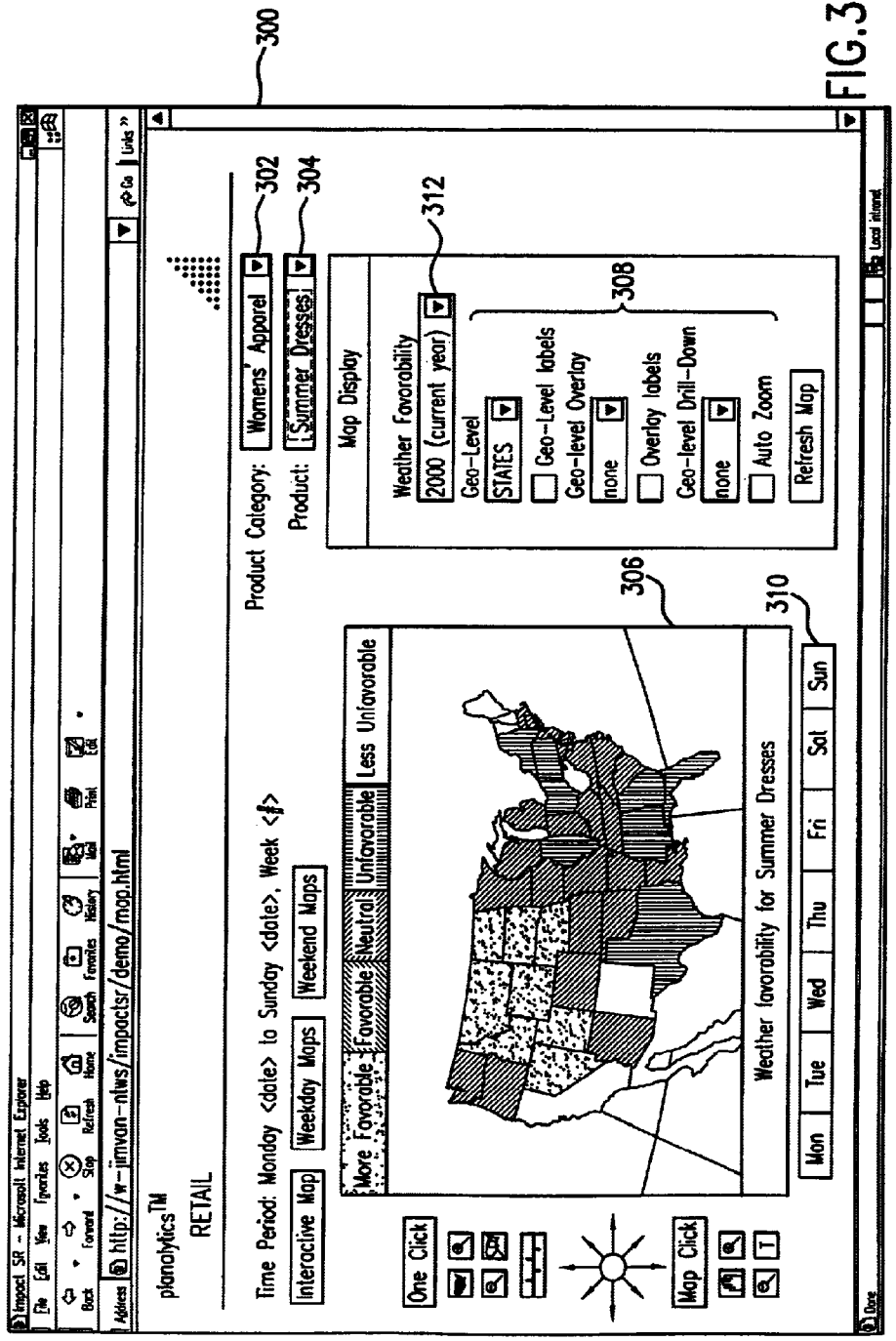
FIGS. 3–5 are exemplary window or screen shots generated by the graphical user interface of the present invention.

In step 216, the user 102, after selecting a product category and then a specific product, would be presented with a GUI screen displaying a weather favorability map such as that shown in FIG. 3. That is, FIG. 3 is an exemplary window or screen 300 generated by the graphical user interface of the present invention, in part by the map server 112, during navigation 200 (i.e., step 216).

Referring to FIG. 3, screen 300 includes a pull-down menu 302 which allows the user 102 to select a product category (step 214) (e.g., "women's apparel"), and a pull-down menu 304 which allows the user 102 to select a specific product within the previously-chosen category (step 214) (e.g., "summer dresses"). As will be apparent to one skilled in the relevant art(s), pull-down menu 304 is context-sensitive and based on the selection made by the user in pull-down menu 302. That is, menu 304 would list only the specific products found within the category selected from menu 302.

In an embodiment of the present invention, screen 300 is an interactive map page which allows the user 102 to "drill-down" (e.g., by using a mouse or other pointing device) to perform such functions as selecting and highlighting a specific geographic area within an interactive map area 306, and auto-zooming to a selected and highlighted area within the interactive map area 306. As will be apparent to one skilled in the relevant art(s), interactive screen 300 also includes a number of map display controls 308 which allow the user 102 to overlay, zoom-in and zoom-out the map displayed within the interactive map area 306. For example, the control labeled "Geo-Level" may be a pull-down menu that allows the user 102 to view the interactive map area 306 on a state level (as shown in FIG. 3), or a regional level, a metropolitan area (MA), a Metropolitan Statistical Area (MSA), any meteorological-based regional division, or the like.

The interactive screen 300 also includes a day of the week navigation bar 310 which changes the display of the weather favorability map within interactive map area 306 based on the day selected using navigation bar 310. That is, interactive map area 306 of SRWF system 100 displays the weather favorability for a given product, within a product category, for a given geographic area and for a given time period as selected by a pull-down menu 312. Such weather favorability, in a preferred embodiment of the present invention, is given by interactive map area 306, where the map area 306 is color-coded to correspond to five favorability ratings: "more favorable," "favorable," "neutral," "unfavorable," and "less favorable." The weather favorability corresponds, for example, to the likelihood of sales of the specified product in the specified geographic location based on historical weather and sales data, and forecasted weather. Such favorability is calculated by the short-range weather adapted, business forecasting tool 100 of the present invention and explained in greater detail below.

Figure 4:
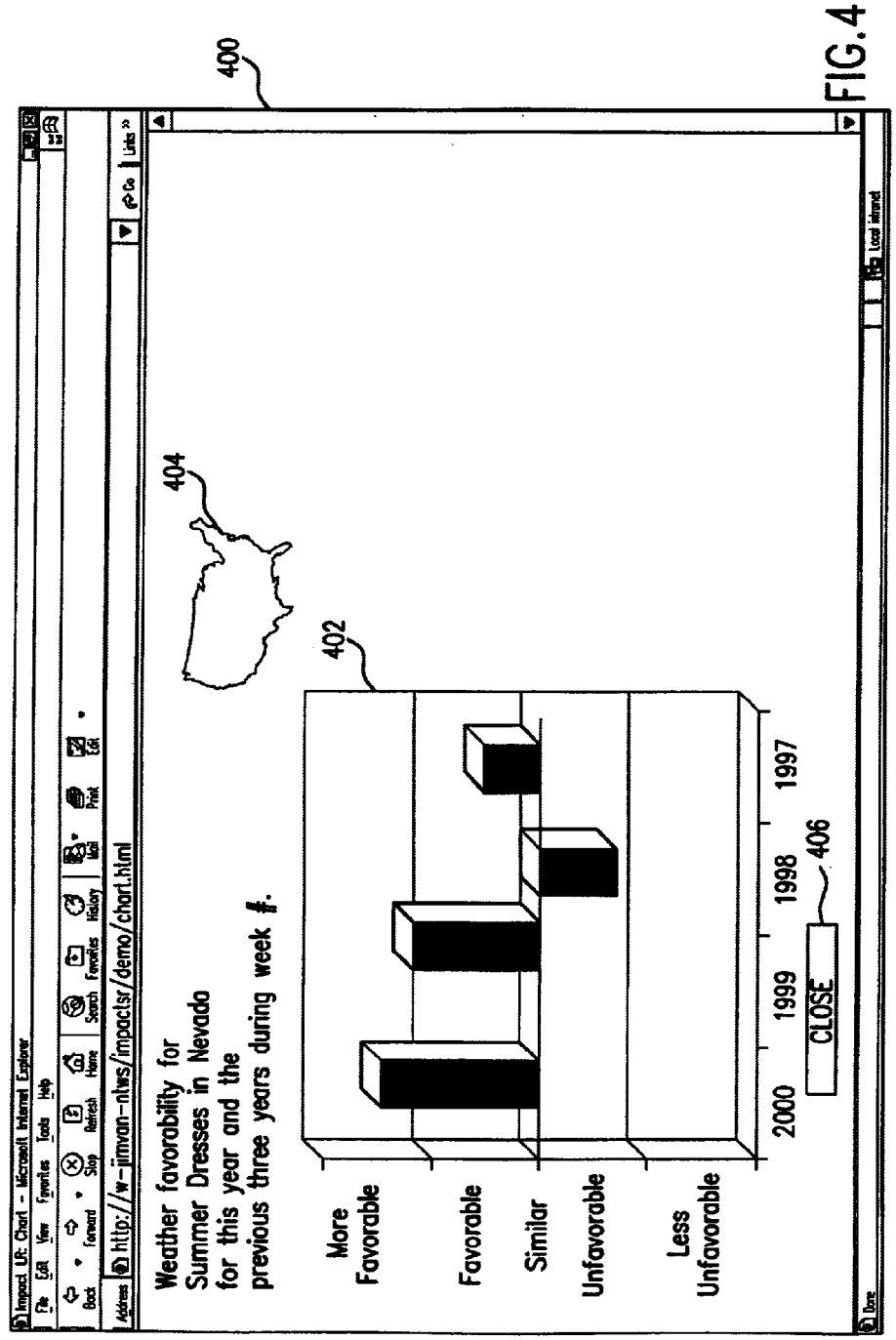

Returning to FIG. 2, the user 102, after being presented with the weather favorability map 306, may invoke a chart pop-up in step 218. Such a chart pop-up is shown in FIG. 4. That is, FIG. 4 is an exemplary window or screen 400 generated by the graphical user interface of the present invention, in part by chart server 114, during navigation 200 (i.e., step 218).

Referring to FIG. 4, screen 400 includes a display of a histogram 402 of weather favorability for a specific product within a product category for a specified geographic location. That is, pop-up screen 400 would appear when the user 102 selected (by using a mouse or other pointing device to click), for example, the state of Nevada while viewing screen 300. A small index map 404 indicates which geographic region (e.g., which state of the United States) the user 102 selected for viewing a pop-up chart. In a preferred embodiment of the present invention, histogram 402 includes predicted weather favorability for the current year (e.g., 2000) as well as historical weather favorability for the previous three years (e.g., 1997–1999). This allows the user 102 to visually see and compare the predicted favorability of the chosen product in comparison to the previous three years. A "close" button 406 would return the user 102 to screen 300.

Figure 5:
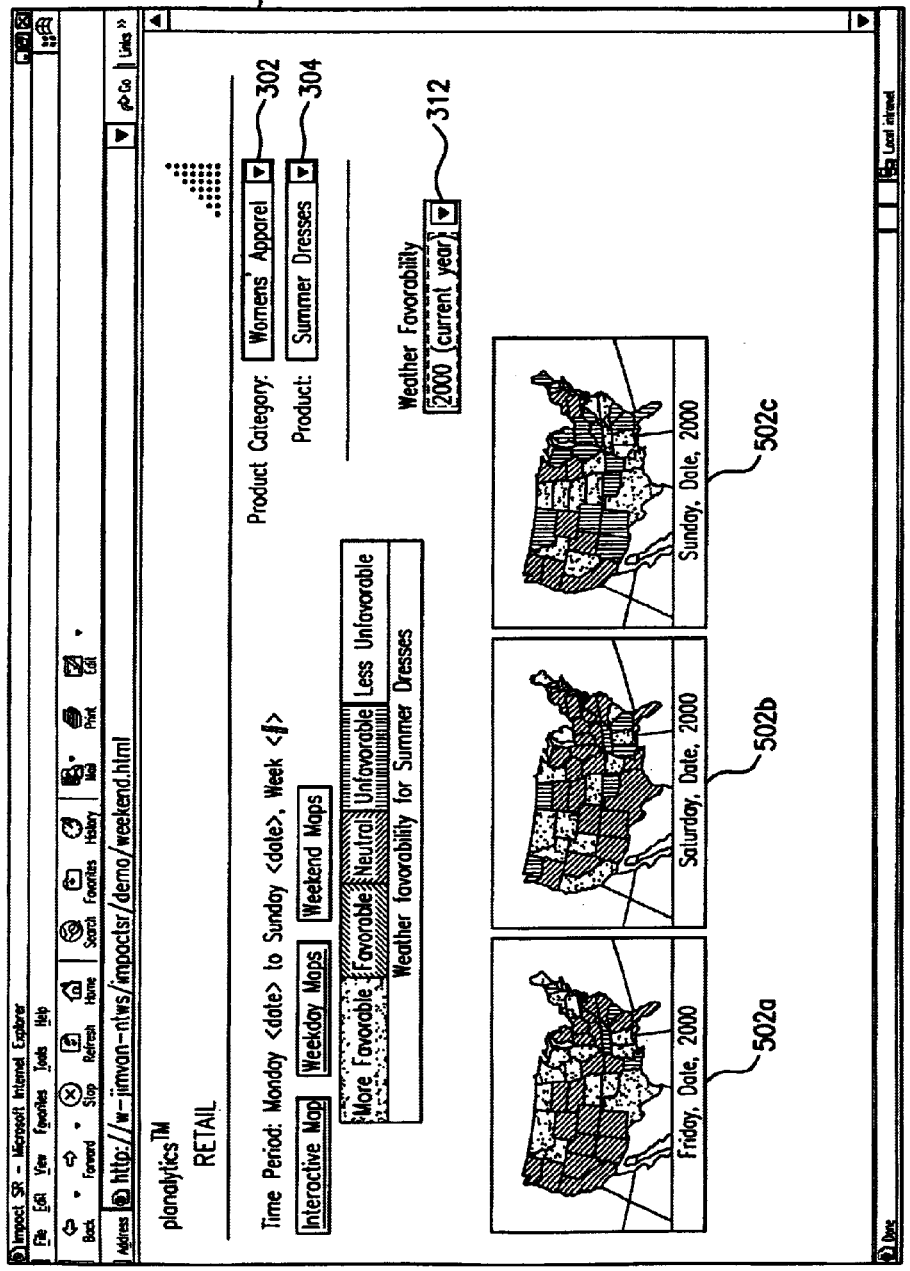

Returning to FIG. 2, the user 102, after being presented with the weather favorability map 306, may invoke an "all weekend/weekday" thumbnail maps display in step 220. Such a thumbnail maps display is shown in FIG. 5. That is, FIG. 5 is an exemplary window or screen 500 generated by the graphical user interface of the present invention, in part by map server 112, during navigation 200 (i.e., step 220).

Referring to FIG. 5, screen 500 includes a display of several weather favorability map areas 402 (shown as weather favorability map areas 402a–c) for a specific product within a product category for a specified geographic location and time period. In the example of screen 500 shown in FIG. 5, the retailer (i.e., user 102) would be presented an individual weather favorability map 402 for each day of the weekend in order to perform planning activities as contemplated by the present invention and explained herein. In an embodiment of the present invention, the weather favorability map areas 402a–c would link back to screen 300 for displaying the interactive map area 306 as explained above.

It should be understood that the control flow of navigation 200, which highlights the functionality of SRWF system 100, is presented for example purposes only. That is, the software architecture of the present invention is sufficiently flexible and configurable such that users 102 may navigate through the system 100 in ways other than that shown in FIG. 2. Further, the present invention is sufficiently flexible and configurable such that the information contained in the GUI screens of FIGS. 3–5 can be presented to users 102 in ways other than those shown in FIGS. 3–5.

IV. Weather and Weather Favorability Matrices

As mentioned above, the weather favorability, in a preferred embodiment of the present invention, is given by interactive map area 306, where the map area 306 is color-coded to correspond to five favorability ratings: "more favorable," "favorable," "neutral," "unfavorable," and "less favorable." The weather favorability corresponds, for example, to the likelihood of sales of the specified product in the specified geographic location for a specified time period, based on historical and forecasted weather.

In an embodiment of the present invention, the SRWF system 100 associates each specific product within a product category with a weather favorability matrix. Such associations are stored within the application database 118 within the database server 115. An example favorability matrix, according to a preferred embodiment of the present invention is shown in TABLE 1.

TABLE 1

|  | DRY | SHOWERS | RAIN | SNOW |
|---|---|---|---|---|
| VERY WARM | $n_1$ | $n_2$ | $n_3$ | $n_4$ |
| WARM | $n_5$ | $n_6$ | $n_7$ | $n_8$ |
| SEASONAL | $n_9$ | $n_{10}$ | $n_{11}$ | $n_{12}$ |
| COLD | $n_{13}$ | $n_{14}$ | $n_{15}$ | $n_{16}$ |
| VERY COLD | $n_{17}$ | $n_{18}$ | $n_{19}$ | $n_{20}$ |

In essence, a favorability matrix is a 5×4 (i.e., five rows by four columns) matrix where each entry, $n_1$ to $n_{20}$, corresponds to the favorability of sales for a specified product given a specific combination of temperature and precipitation conditions. In alternative embodiments of the present invention, favorability matrices with additional temperature or precipitation categories (e.g., "snow showers," "ice," etc.) may be employed.

The favorability matrix of the present invention, as shown in TABLE 1, employs five meteorological categories of "very warm," "warm," "seasonal," "cold," and "very cold" for temperature conditions and four meteorological categories of "dry," "showers," "rain," and "snow" for precipitation conditions. Before further describing the SRWF system 100, the following terms used herein are first defined. In the event that a term defined herein has a more common meaning or usage, the definition provided herein should be taken as the intended meaning.

Cold: Colder than seasonal for a particular location and time based on historical frequency distribution curves. That is, "cold" can occur in July when, for example, it is 79° F. in Philadelphia when 85° F. is "seasonal" or normal weather. This is because the perception to people in the Philadelphia geographic region is the day is not a typical July day, and thus "cold."

Dry: Precipitation that is below the defined seasonal or normal amount for a specific location on a given date or during a specific time period.

Precipitation: Any or all forms of water particles, whether liquid or solid, that fall from the atmosphere. The term includes such forms as drizzle, rain, showers, snowfall, snow pellets or grains, ice crystals, and hail.

Rain: Liquid form of continuous or steady precipitation as distinguished from the more erratic showers. Intensities vary from light to heavy.

Seasonal: In keeping with, or appropriate to, the time or season; timely; about normal or routine for the time of the year. Typical weather elements (temperature, precipitation, etc.) for a given location at a specific time (daily, weekly, monthly, yearly, etc.).

Showers: Precipitation usually characterized by the suddenness with which it starts and stops, by its rapid change of intensity, and by its spotty, hit-and-miss nature.

Snow: Precipitation composed of white or translucent ice crystals, chiefly configured in branched hexagon form. To convert snowfall amounts to liquid precipitation, divide the snowfall amount by 10.

Warm: Temperatures that are above the seasonal (normal) range for a given location at a specific period of time.

Very Cold: The top 10% coldest days that have historically occurred over a 30 year period from, for example, 1961–1990 based on a historical frequency distribution for a given location at a specific time period.

Very Warm: The top 10% warmest days that have historically occurred over a 30 year period from, for example, 1961–1990 based on a historical frequency distribution for a given location at a specific time period.

Historical Frequency Distribution: A frequency curve for observed meteorological events (e.g., temperature) where observed ranges are typically classified into 10/20/40/20/10 buckets, with 10% of events classified as very warm, the next 20% as warm, the next 40% as seasonal, the next 20% as cold and the final 20% as very cold. A hypothetical frequency distribution curve may be:

95–100 degrees=10 events—classified as Very Warm
  85–94 degrees=20 events—classified as Warm
  80–84 degrees=40 events—classified as Seasonal
  70–79 degrees=20 events—classified as Cold
  60–69 degrees=10 events—classified as Very Cold, where the temperature ranges that fall into the five frequency distribution categories will vary by geographic location and specified time period.

In a preferred embodiment of the present invention, $n_1$ to $n_{20}$ would each take on a numerical value from the set of:
  $\{-2, -1, 0, +1, +2\}$ The assigned numerical values of $n_1$ to $n_{20}$ to the "more favorable," "favorable," "neutral," "unfavorable," and "less favorable" favorability ratings given in the map area 306 of screen 300, in a preferred embodiment of the present invention, are given more specifically in TABLE 2.

TABLE 2

| FAVORABILITY RATING | VALUE $N_1$ |
|---|---|
| More Favorable | +2 |
| Favorable | +1 |
| Neutral (Typical) | 0 |
| Unfavorable | −1 |
| More Unfavorable | −2 |

In an alternate embodiment, one additional favorability rating would be employed by the SRWF system 100—"N/A" This "not applicable" favorability rating would indicate that such a specific product was "out of season" for the specific time period the user 102 is currently interested in viewing. This "N/A" or "not applicable" favorability rating is needed because, from a retail point of view, ceratin products would customarily never be sold in certain regions during specified time periods irrespective of weather. For example, air conditioning units would never be sold in the Rocky Mountain region of the United States even in above-average temperature weather conditions.

Figure 6A:
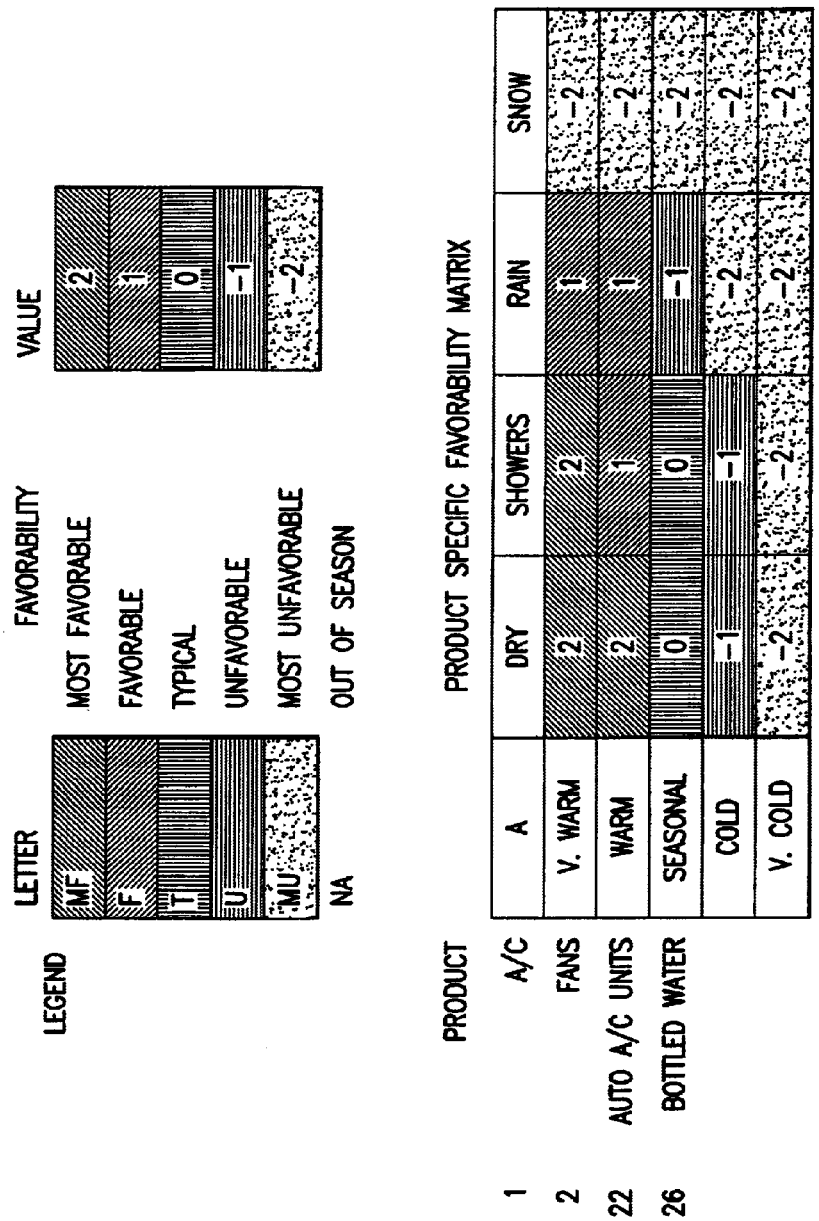
FIG. 6 is a representation of the assignment of different products to favorability matrices within an application database according to an embodiment of the present invention.

In a preferred embodiment of the present invention, the number of matrices stored in the application database 118 within the database server 115 is not one-for-one with the number of specific products within the various product categories. That is, the SRWF system 100 may optimize (i.e., reduce) the number of favorability matrices stored in the application database 118 by assigning one or more products (regardless of product category) to the same favorability matrix. This would be done, as will be appreciated by those skilled in the relevant art(s), when certain products are "proxies" for each other. That is, the sale of ceratin products are adversely or favorably affected by the same weather conditions. For example, umbrellas and rain coats may be assigned (i.e., associated) with the same favorability matrix within the (relational) application database 118. A representation of the assignment of different products to favorability matrices within the application database 118 is shown in FIG. 6. As will be appreciated by those skilled in the relevant art(s), the personnel of the SRWF application service provider, using, for example, administrative workstation 128 would create different favorability matrices and assign one or more products to them based on an analysis of historical sales data for such products along with historical weather data.

V. Functional Description

Figure 7:
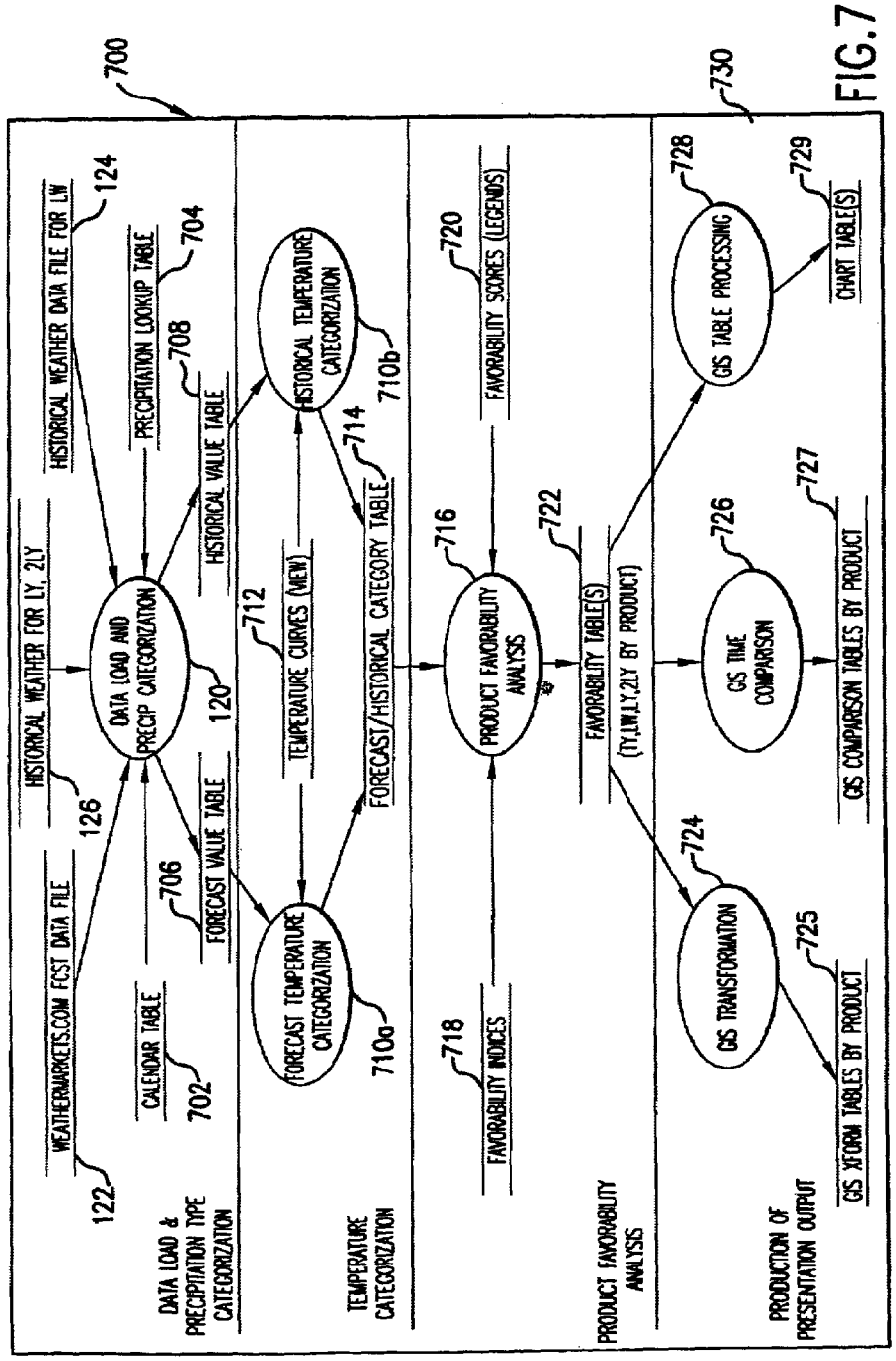
FIG. 7 is a functional diagram of a weather adapted, retail performance forecasting system according to a preferred embodiment of the present invention.

Referring to FIG. 7, a functional diagram 700 representing the operation of the SRWF system 100, according to a preferred embodiment of the present invention, is shown. The functionality of SRWF system 100 is described in FIG. 7 in terms of four processes: the data load process 120, a temperature categorization process 710, a product favorability analysis 716, and an output production process 730. As will be appreciated by one skilled in the relevant art(s), the functional description of SRWF system 100 below makes reference to exemplary data structure designs of FIGS. 11A–H.

As suggested above, the data load process 120 is a stored procedure that resides within the database server 115. This stored procedure contains software code logic that is responsible for loading data from at least three sources: the forecast data file 122; the daily weather data files 124 that each contain daily actual (e.g., precipitation and temperature) observations for each day of the past week for every geographic location that the SRWF system 100 covers; and the enterprise weather database 126 which contains historical weather data for the same period last year (LY) and two years ago (2LY).

A calendar table 702 is generated for use within the application database 118 to drive the selection of dates in historical data that are equivalent to the forecast. The calendar table 702 is applied by application programs and procedures located within the application database 118 to align dates for comparison of resultant favorability values in addition to the initial historical data selection. A data structure reflecting the design of the calendar table 702, in one embodiment of the present invention, is shown in FIG. 11A.

Forecast and historical data sources classify precipitation events differently. Thus, a precipitation event lookup table 704 is used to within the application database 118 to appropriately correlate forecast or historical precipitation event types with the precipitation event types included in the favorability matrices as described above. The precipitation event lookup table 704 assures that handling of precipitation event types within the application database 118 is consistent. A data structure reflecting the design of the precipitation event lookup table 704, in one embodiment of the present invention, is shown in FIG. 11B.

The data load process generates a forecast value table 706 and a historical value table 708 as its outputs. A data structure reflecting the design of the forecast value table 706 and the historical value table 708, in one embodiment of the present invention, is shown in FIG. 11C.

The forecast value table 706 and historical value table 708 are inputted into the temperature categorization process 710 (shown as process 710a and 710b for forecast and historical data, respectively). The temperature values within the forecast value table 706 and historical value table 708 need to be respectively categorized in order to identify the appropriate score values from the favorability matrices. (See TABLE 2.) For each geographic location for which a forecast is requested, historical data will be matched against temperature curve tables 712 that decodes a temperature at a geographic location for any time of the year to the scale of "very warm," "warm," "seasonal," "cold," or "very cold." (See TABLE 1.) The output of temperature categorization process 710 is a forecast category and historical category table 714. A data structure reflecting the design of the forecast category and historical category table 714, in one embodiment of the present invention, is shown in FIG. 11D.

The product favorability analysis 716 process compares the content of the forecast category and historical category table 714 against the weather favorability matrices. That is, the content of the forecast/historical category table 714 is compared to the favorability matrices 718 (i.e., see TABLE 1) in order to determine the scores 720 to be applied. The outputs of the product favorability analysis 716 process are favorability tables 722 by product for the forecast week (This Year or TY), last week (LW), last year (LY), and two years ago (2LY). A data structure reflecting the design of the product favorability tables 722, in one embodiment of the present invention, is shown in FIG. 11E.

The favorability tables 722 can then be used as an input into the output production process 730. Process 730 includes three sub-processes—a GIS transformation process 724, GIS time comparison process 726, and a chart table processing 728.

When the favorability table 722 is inputted into the GIS transformation process 724, GIS product transform tables 725 are produced. A data structure reflecting the design of the GIS product transform tables 725, in one embodiment of the present invention, is shown in FIG. 11F. The GIS transformation process 724 restructures the data in the favorability tables 722 to optimize performance (i.e., reduce the querying that must be done to the application database 118) during the map rendering operations of the SRWF system 100. Referring to FIG. 11G, a pre-GIS transformation product favorability table 722 is shown. It contains one record for each geographic location for each day within a given time period. (In one embodiment, the geographic locations of the SRWF system 100, as shown in FIG. 11G, are termed "stations" and refer to and use industry-recognizable airport codes.) The optimization of the GIS transformation process 724, however, produces a series of GIS product transform tables 725, an example of which is shown in FIG. 11H. The table of FIG. 11H (like the data structure shown on FIG. 11F) includes one row per location indicating the weather favorability rating for one product. As suggested above, this table is more optimally handled by the SRWF system 100 during map rendering operations.

When the favorability table 722 is inputted into the GIS time comparison process 726, GIS time comparison tables 727 are produced (which are similar in structure to the GIS product transform tables 725 and thus represented by the same data structure shown in FIG. 11F). The GIS time comparison process 726 compares the TY output of each geographic location against LW, LY and 2LY, for each product. (See FIG. 4.)

When the favorability table 722 is inputted into the chart table processing 728, chart tables 729, such as screen 400 shown in FIG. 4, are produced. The chart table processing 728 restructures data to optimize performance for rendering business chart graphics.

As will be apparent to one skilled in the relevant art(s), any one of the three sub-processes of process 730 is triggered by user 102 inputs. In an alternate embodiment, any one of the three sub-processes may be triggered by user-configurable programs that are executed on a pre-defined schedule. For example, a user 102 may desire to execute a particular sub-process every Sunday and Wednesday, or even on a daily basis in order to perform short-range weather adapted, business forecasting.

It should be understood that the operation of SRWF system 100, as shown in diagram 700 is presented for example purposes only. That is, the software and physical architecture of the present invention is sufficiently flexible and configurable such that it may operate in ways different than that shown in FIG. 7, while providing subscribers 102 with the same features described herein.

VI. Weather Databases

The above description of the SRWF system 100, discusses how the weather favorability maps displayed in interactive map area 306 of screen 300 allows users 102 to make informed, short-range weather adapted advertising, allocation, placement, promotion and staffing decisions. It is also clear that the favorability ratings of "more favorable," "favorable," "neutral," "unfavorable," and "less favorable," which users 102 utilize to make such decisions are based, in part, on correlations of past and future weather. Thus, the past and future weather data are now described in more detail.

A. Enterprise Weather Database

An example enterprise weather database 126 containing historical weather data is shown in FIG. 8. An enterprise weather database 126 is described in detail in a commonly-owned U.S. Pat. No. 5,832,456 incorporated herein by reference in its entirety. For completeness, however, the enterprise weather database 126 is briefly described herein. The enterprise weather database 126 includes, for each year in the view, one or more records for each metropolitan area (MA). (The term MA closely resembles the well known name Metropolitan Statistical Area (MSA). However MA encompasses a larger surrounding geographical area/region than the strict MSA definition.) (However, since MA and MSA are similar, they are used interchangeably herein.) The enterprise weather database 126 contains but is not limited to data on metropolitan areas. These records contain information specifying the weather that occurred in the subject MA in the time span represented in the view. Specifically, for each MA, there is a record for each of several weather data types.

In an embodiment of the present invention, there are three classes of weather data types in the enterprise weather database 126—seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. Of course, values other than 1, 0, and −1 could be alternatively used to indicate these relationships. Also, other weather data types may be used.

The historical weather information in the enterprise weather database 126 is provided on a per period basis. As indicated above, the period may be any increment of time, such as daily, weekly, bi-weekly, monthly, bi-monthly, quarterly, etc. Preferably, the increment of time represented by a period is the same in both of the weather databases (i.e., database 126 and the source for file 122) within SRWF system 100.

Each weather pattern includes one or more weather parameters. For example, the temperature weather pattern includes the temperature parameter and the seasonal parameter. For any given period, each parameter can be either seasonal, below seasonal, or above seasonal. For any given period, the values of these weather patterns are represented by the entries (see records 802–805 in FIG. 8) in the enterprise weather database 126 having the category data type. This file is used as the "look up" to allow the system 100 to determine which patterns it will use.

In an embodiment of the present invention, the enterprise weather database 126 would comprise historical weather data available from the National Climatic Data Center (NCDC). The NCDC is an agency within the U.S. Commerce Department that archives weather data obtained by the National Weather Service, Military Services, Federal Aviation Administration, and the Coast Guard, as well as data from voluntary cooperative observers.

B. Weather Forecast Data

An example weather forecast database 900 from which the weather forecast file 122 can be read by the database server 115 during operation of the SRWF system 100 is shown in FIG. 9. A weather forecast database 900 is described in detail in the commonly-owned U.S. Pat. No. 5,832,456 incorporated herein by reference in its entirety. For completeness, however, the weather forecast database 900 is briefly described herein. The weather forecast database 900 includes, for each future year in the view, one or more records for each MA. These records (e.g., records 902–904) contain information specifying the weather that is predicted to occur in the subject MA in the future time span represented in the view. Specifically, for each MA, there is a record for each of several weather data types.

Similar to enterprise weather database 126, weather forecast database 900 contains three classes of weather data types—seasonal, actual and category. These categories are the same as those described above with respect to the enterprise weather database 126. Accordingly, the above description of the enterprise weather database 126 also applies to the weather forecast database 900.

In a preferred embodiment of the present invention, a suitable weather forecast database 900, from which the weather forecast file 122 can be read in during operation of the SRWF system 100, is commercially available from WeatherMarkets.com of Wayne, Pa., which provides global weather forecasting data. Other forms of forecast weather data to be used as the source of weather forecast files 122 are available from other commercial or governmental sources (e.g., National Weather Service and the like). It should be noted, however, that the software code logic in the data load process 120 would need to be modified accordingly in order to read the various formats of these data files 122.

C. Relationship Between Past and Future Weather Data

As evident by the description above, the enterprise weather database 126 is a past database because it contains historical information. In contrast, the weather forecast database 900 is a future database because it contains information pertaining to predicted weather in the future, or future weather.

Both databases contain information on a per period basis. Preferably, the increment of time represented by a period is the same in both databases. Also, the periods in both databases are synchronized. Suppose that the increment of time is set equal to one month in an administration setup process using administration workstation 128. In this example, if it is assumed that period P1 represents January, then in enterprise weather database 126, period P1 represents January of a past year. Similarly, in the weather forecast database 900, period P1 will represent January of a future year.

VII. Example Implementations

Figure 10:
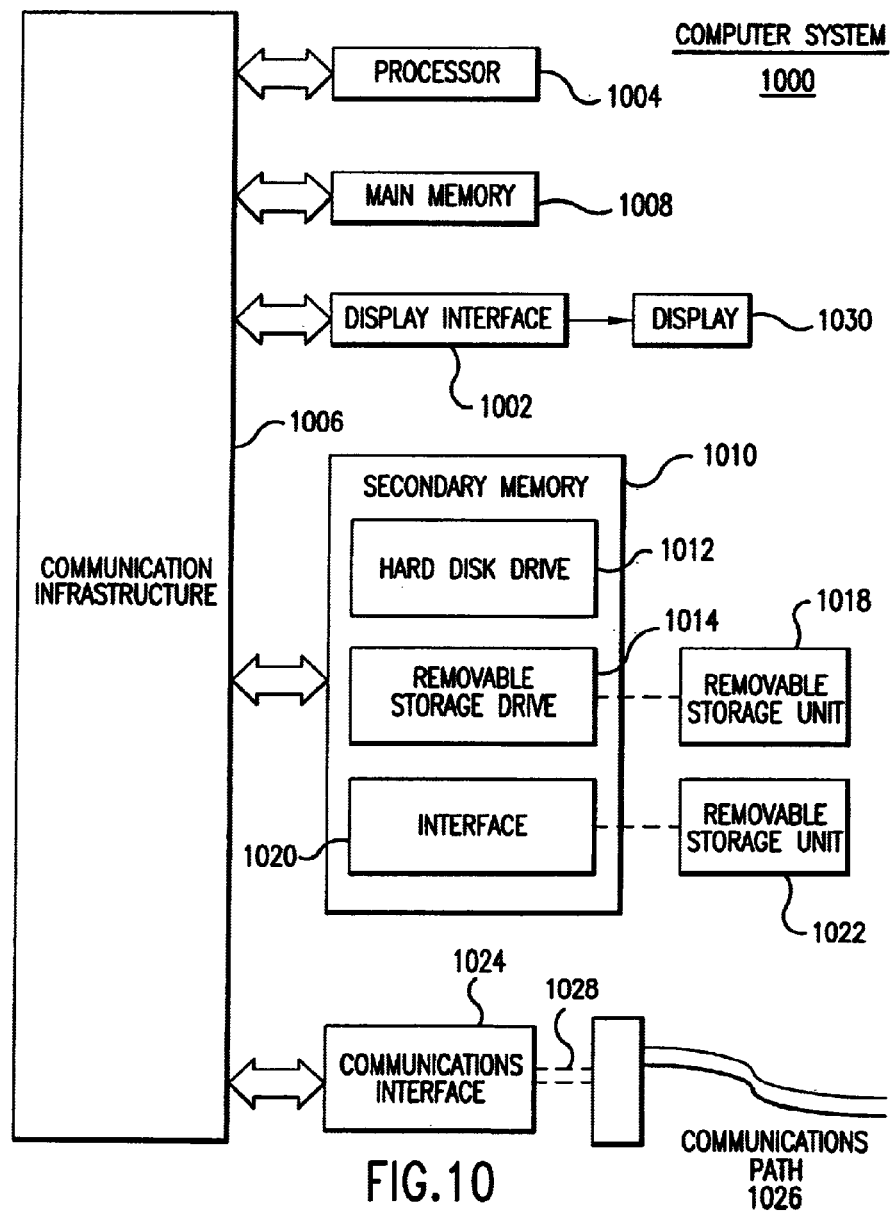
FIG. 10 is a block diagram of an exemplary computer system useful for implementing the present invention.

The present invention (i.e., SRWF system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 1000 is shown in FIG. 10. The computer system 1000 includes one or more processors, such as processor 1004. The processor 1004 is connected to a communication infrastructure 1006 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 1000 can include a display interface 1005 that forwards graphics, text, and other data from the communication infrastructure 1002 (or from a frame buffer not shown) for display on the display unit 1030.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a phone line, a cellular phone link, an RF link and other communications channels.

In this document, the terms "computer program medium" and "computer usable medium" are used to generally refer to media such as removable storage drive 1014, a hard disk installed in hard disk drive 1012, and signals 1028. These computer program products are means for providing software to computer system 1000. The invention is directed to such computer program products.

Computer programs (also called computer control logic) are stored in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VIII. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A computer-based method for providing a user with a short-range weather adapted, business forecast, comprising the steps of:
   (1) providing the user, via a graphical user interface, with a selection of product categories;
   (2) receiving, from the user, via said graphical user interface, a product category input for a product category from among said selection of product categories;
   (3) providing the user, via said graphical user interface, with a selection of specific products based on said product category input;
   (4) receiving, from the user, via said graphical user interface, a specific product input for a specific product from among said selection of specific products;
   (5) receiving a future time period input for a future time period from the user, via said graphical user interface, wherein said future time period encompasses at least one day;

(6) receiving a geographic location input for a geographic location from the user, via said graphical user interface; and (7) displaying to the user, via said graphical user interface, a first weather favorability map of said geographic location that displays a weather favorability for said specific product, within said product category, for each said at least one day within said future time period;

whereby the user can make informed retail-based advertising, allocation, placement, promotion and staffing decisions using said first weather favorability map.

2. The method of claim 1, wherein said first weather favorability map indicates one rating for each said at least one day within said future time period, said one rating being one of:
  (i) a "more favorable" rating,
  (ii) a "favorable" rating,
  (iii) a "neutral" rating,
  (iv) an "unfavorable" rating, and
  (v) a "less favorable" rating.

3. The method of claim 1, wherein said future time period inputted by the user is a next upcoming weekend.

4. The method of claim 1, wherein said future time period inputted by the user is a current week.

5. The method of claim 1, wherein step (7) comprises the steps of:
  (a) querying a forecast weather database, coupled to a database server, for weather forecast data for said future time period and for said geographic location;
  (b) querying an application database, coupled to said database server, for a favorability matrix associated with said specific product; and
  (c) determining, via an application server, a favorability rating for said specific product during each said at least one day of said future time period in said geographic location using said favorability matrix.

6. The method of claim 5, wherein step (7) further comprises the steps of:
  (d) querying a weather history database, coupled to said database server, for historical weather data for said geographic location, location and a past time period, wherein days within said past time period correspond to same days for L years ago within said future time period; and
  (e) displaying to the user, via said graphical user interface, a second weather favorability map of said geographic location that displays the weather favorability for said specific product, within said product category, for each said at least one day within said past time period;

whereby said second weather favorability map allows the user to compare said weather favorability of said first weather favorability map for said future time period with said weather favorability of said second weather favorability map for said past time period.

7. The method of claim 6, wherein L is either one or two.

8. A system for allowing a user to perform short-range weather adapted, business forecasting, comprising:
  (A) a historical weather database containing historical weather information for a geographic area;
  (B) a future weather database containing weather forecast information for said geographic area;
  (C) an application database, connected to said historical weather database and said future weather database, that stores a plurality of weather favorability matrices, each being associated with at least one of a plurality of products; and
  (D) a graphical user interface, connected over a network to said application database, capable of displaying weather favorability maps for each of said plurality of products in said geographic area during each day of a user-specified future time period;

whereby the user can make informed retail-based advertising, allocation, placement, promotion and staffing decisions using said weather favorability maps.

9. The system of claim 8, further comprising:
  (E) an application server, connected to said network, capable of querying said application database and said future weather database in order to generate said weather favorability maps displayed on said graphical user interface.

10. The system of claim 8, wherein said network is at least a portion of the Internet.

11. A computer program product comprising a computer usable medium having control logic stored therein for causing a computer to provide a user with a short-range weather adapted, business forecast, said control logic comprising:
  first computer readable program code means for causing the computer to provide the user with a selection of product categories;
  second computer readable program code means for causing the computer to receive, from the user, a product category input for a product category from among said selection of product categories;
  third computer readable program code means for causing the computer to provide the user with a selection of specific products based on said product category input;
  fourth computer readable program code means for causing the computer to receive, from the user, a specific product input for a specific product from among said selection of specific products;
  fifth computer readable program code means for causing the computer to receive a future time period input for a future time period from the user, wherein said future time period encompasses at least one day;
  sixth computer readable program code means for causing the computer to receive a geographic location input for a geographic location from the user; and
  seventh computer readable program code means for causing the computer to display to the user, via a graphical user interface, a weather favorability map that displays a weather favorability for said specific product, within said product category, for said geographic location and for each said at least one day within said future time period.

12. The computer program product of claim 11, wherein said seventh computer readable program code means comprises:
  eighth computer readable program code means for causing the computer to query a forecast weather database for weather forecast data for said future time period and for said geographic location;
  ninth computer readable program code means for causing the computer to query an application database for a favorability matrix associated with said specific product; and
  tenth computer readable program code means for causing the computer to determine a favorability rating for said specific product during said future time period in said geographic location using said favorability matrix.

* * * * *

UNITED STATES PATENT AND TRADEMARK OFFICE
CERTIFICATE OF CORRECTION

| | | |
|---|---|---|
| PATENT NO. | : 7,069,232 B1 | Page 1 of 1 |
| APPLICATION NO. | : 09/656397 | |
| DATED | : June 27, 2006 | |
| INVENTOR(S) | : Fox et al. | |

It is certified that error appears in the above-identified patent and that said Letters Patent is hereby corrected as shown below:

Title Page
Item[56], U.S. PATENT DOCUMENTS section, please add the following missing reference --6,035,285   3/2000  Schlect et al.......705/30--.

Column 23
Line 41 please replace "geographic location, location and a past time" with --geographic location and a past time--.

Signed and Sealed this

Eighth Day of May, 2007

JON W. DUDAS
*Director of the United States Patent and Trademark Office*